(12) United States Patent  
Leone et al.

(10) Patent No.: US 11,280,278 B2
(45) Date of Patent: Mar. 22, 2022

(54) METHODS AND SYSTEMS FOR A SERIES GAP IGNITER WITH A PASSIVE PRE-CHAMBER

(71) Applicant: Ford Global Technologies, LLC, Dearborn, MI (US)

(72) Inventors: Thomas G. Leone, Ypsilanti, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/920,861

(22) Filed: Jul. 6, 2020

(65) Prior Publication Data

US 2022/0003176 A1    Jan. 6, 2022

(51) Int. Cl.
| | |
|---|---|
| *F02B 19/12* | (2006.01) |
| *F02B 19/18* | (2006.01) |
| *F02D 35/02* | (2006.01) |
| *H01T 13/46* | (2006.01) |
| *F02P 5/153* | (2006.01) |
| *F02P 5/15* | (2006.01) |
| *F02D 13/02* | (2006.01) |
| *F02D 41/00* | (2006.01) |
| *F02D 41/04* | (2006.01) |

(52) U.S. Cl.
CPC ............ *F02D 35/024* (2013.01); *F02B 19/12* (2013.01); *F02B 19/18* (2013.01); *F02D 13/0261* (2013.01); *F02D 35/021* (2013.01); *F02D 41/0052* (2013.01); *F02D 41/0077* (2013.01); *F02D 41/04* (2013.01); *F02P 5/1502* (2013.01); *F02P 5/153* (2013.01); *H01T 13/465* (2013.01); *F02D 2200/024* (2013.01)

(58) Field of Classification Search
CPC ........ F02B 19/12; F02B 19/18; F02D 35/021; F02D 35/024; F02P 5/153; H01T 13/462; H01T 13/465
USPC ...... 123/143 B, 169 EL, 260, 266, 268, 287, 123/406.41; 313/123; 73/114.08, 114.62
See application file for complete search history.

(56) References Cited

U.S. PATENT DOCUMENTS

| | | | | |
|---|---|---|---|---|
| 4,489,596 | A | * | 12/1984 | Linder .................... H01T 13/18 313/137 |
| 4,924,829 | A | * | 5/1990 | Cheng ................... H01T 13/462 123/259 |
| 5,189,333 | A | | 2/1993 | Kagawa et al. |
| 6,089,077 | A | * | 7/2000 | Daniels ................ F02D 35/021 73/35.03 |
| 7,741,762 | B2 | * | 6/2010 | Alger, II ................ H01T 13/20 313/143 |
| 7,856,956 | B2 | * | 12/2010 | Inoue ..................... H01T 13/54 123/267 |

(Continued)

*Primary Examiner* — Erick R Solis
(74) *Attorney, Agent, or Firm* — Geoffrey Brumbaugh; McCoy Russell LLP

(57) ABSTRACT

Methods and systems are provided for operating a cylinder with a series gap igniter coupled to an ion sensing module. In one example, a method may include determining a location of an initial combustion in a cylinder from a series gap igniter based on a pressure rise rate in the cylinder, the ignition spark initiating combustion in the cylinder; and adjusting at least one setting of the cylinder based on the (Continued)

determined location. In this way, combustion stability and efficiency may be increased without increasing a cost and complexity of the engine.

19 Claims, 7 Drawing Sheets

(56) References Cited

U.S. PATENT DOCUMENTS 8,925,518 B1 1/2015 Riley et al.

* cited by examiner

METHODS AND SYSTEMS FOR A SERIES GAP IGNITER WITH A PASSIVE PRE-CHAMBER

FIELD

The present description relates generally to methods and systems for engines having passive pre-chamber ignition systems.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a pre-chamber. A passive pre-chamber may be a walled chamber located in the clearance volume of the cylinder and may include a spark plug. During engine operation, an air-fuel mixture is introduced into the cylinder, and a fraction of the air-fuel mixture is inducted into the passive pre-chamber via a pressure differential between the passive pre-chamber and the cylinder during a compression stroke of the cylinder. When ignition is requested, the spark plug in the pre-chamber actuates, igniting the fraction of the air-fuel mixture in the pre-chamber. After the fraction of the air-fuel mixture is ignited in the pre-chamber, jets of flame and hot gas may exit the pre-chamber and enter the cylinder via one or more holes in the pre-chamber walls. These jets ignite the air-fuel mixture in the cylinder to produce torque.

Pre-chamber ignition may offer performance and efficiency benefits over a traditional spark-ignition engine during some engine operating conditions. For example, a cylinder with pre-chamber ignition may operate with more dilution (e.g., higher exhaust gas recirculation or a leaner air-fuel ratio) than a similar cylinder of a traditional spark-ignition engine, which may lead to lower fuel consumption in the cylinder with pre-chamber ignition. As another example, a cylinder pressure after ignition may increase more quickly, and with a higher amplitude, in a cylinder with pre-chamber ignition. For example, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

However, passive pre-chamber systems do not offer direct control of fuel and oxygen levels in the pre-chamber. For example, during low load operation, the amount of the air-fuel mixture inducted into the passive pre-chamber may decrease, and low levels of fuel and oxygen in the passive pre-chamber may result in decreased combustion stability and an increased incidence of pre-chamber misfire. In another example, during a cold start condition, a low temperature in the passive pre-chamber may decrease a combustion stability of the pre-chamber.

Other attempts to increase the combustion stability of passive pre-chamber systems across a range of operating conditions include systems for directly injecting both fuel and air into the pre-chamber, referred to herein as an active pre-chamber system. One example approach is shown by Riley et al. in U.S. Pat. No. 8,925,518 B1. Therein, an active pre-chamber system including direct fuel injection and direct oxygen injection in a pre-chamber is disclosed. By including direct fuel injection in the pre-chamber, an AFR of the pre-chamber may be commanded independently of an AFR of the cylinder. Still other attempts to address the combustion stability of passive pre-chamber systems across a range of operating conditions include systems including a second spark plug in a main chamber of a cylinder in addition to a passive pre-chamber in the cylinder, referred to herein as a dual-spark pre-chamber system. By including a passive pre-chamber and the second spark plug in the main chamber of the cylinder, the second spark plug may be used during conditions when the combustion stability of the passive pre-chamber is expected to be relatively low.

However, the inventors herein have recognized potential issues with such systems. As one example, in systems with an active pre-chamber system, the addition of pre-chamber fuel injectors and pre-chamber air injectors may increase a cost and complexity of the system and may introduce significant packaging constraints. As another example, in systems with a dual spark pre-chamber system, the addition of a second spark plug may also increase the cost and complexity and packaging constraints of the system.

In one example, the issues described above may be addressed by a method, comprising: determining a location of initial combustion in a cylinder from a series gap igniter based on a pressure rise rate in the cylinder; and adjusting at least one setting of the cylinder based on the determined location. In this way, a cylinder with a series gap igniter may be operated to favor different ignition sources based on engine operating conditions in order to efficiently and reliably initiate combustion. By adjusting cylinder settings for pre-chamber ignition and main chamber spark ignition based on the pressure rise rate in the cylinder, the engine may increase efficiency while providing pre-chamber ignition (e.g., igniting an air-fuel mixture in the cylinder with jets of flame and hot gas from combustion in a passive pre-chamber) and spark ignition (e.g., igniting the air-fuel mixture in the cylinder with an ignition spark in the cylinder).

As one example, when the cylinder is operating with pre-chamber ignition, the initial combustion is located in the pre-chamber of the series gap igniter, and when the cylinder is operating with spark ignition, the initial combustion is located in the main chamber of the cylinder (e.g., external to the series gap igniter). Further, a controller may determine the pressure rise rate in the cylinder via ion sensing. For example, an ignition system may include an ion sensing module, which may monitor an ionization current across the series gap igniter after actuation. Further, the ionization current may be used to estimate a pressure rise rate in the cylinder during combustion. The amplitude of the pressure rise rate and the delay in pressure increases after spark plug actuation may be used to detect an ignition source. For example, a higher pressure rise rate and/or a shorter delay after spark plug actuation may indicate pre-chamber ignition, while a lower pressure rise rate and/or a longer delay after spark plug actuation may indicate spark ignition. Therefore, based on the signal from the ion sensing module, the controller may determine whether the cylinder is operating with pre-chamber ignition or spark ignition.

As another example, based on the determined location of the initial combustion, cylinder settings may be adjusted. For example, cylinder settings may be adjusted to favor the detected ignition source (e.g., pre-chamber ignition or spark ignition in the main chamber). As an example, the cylinder settings may include an air-fuel ratio (AFR) a spark timing, and a burned gas dilution level. Further, an EGR valve position and/or variable valvetrain may be adjusted to increase an amount of dilution while operating with pre-chamber ignition, and to decrease the amount of dilution while operating with spark plug ignition. For example, while operating with pre-chamber ignition, the cylinder settings may be adjusted to increase dilution with increased valve overlap, i.e. with earlier intake valve opening timing and/or later exhaust valve closing timing. While operating with main chamber ignition, cylinder settings may be adjusted to decrease dilution with decreased valve overlap, i.e. with later intake valve opening timing and/or earlier exhaust valve closing timing. Further, while operating with pre-chamber ignition, the air-fuel ratio may be lean of stoichiometric, and while operating with main chamber ignition, the air-fuel ratio may be stoichiometric or rich. Further still, while operating with pre-chamber ignition, the spark timing may be retarded, and while operating with spark ignition, the spark timing may be advanced.

By providing both a pre-chamber spark and an in-cylinder spark via a single series gap igniter, the performance and efficiency increases of pre-chamber ignition may be achieved without including additional pre-chamber injectors or cylinder spark plugs and without experiencing performance degradation during low load and/or low temperature operating conditions. Further, by differently adjusting cylinder settings, including an actuation timing of the series gap igniter, based on whether pre-chamber ignition is desired or cylinder spark ignition is the ignition source, combustion may be reliably produced over a wide range of operating conditions. Overall, engine performance may be increased without increasing a cost and complexity of an ignition system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
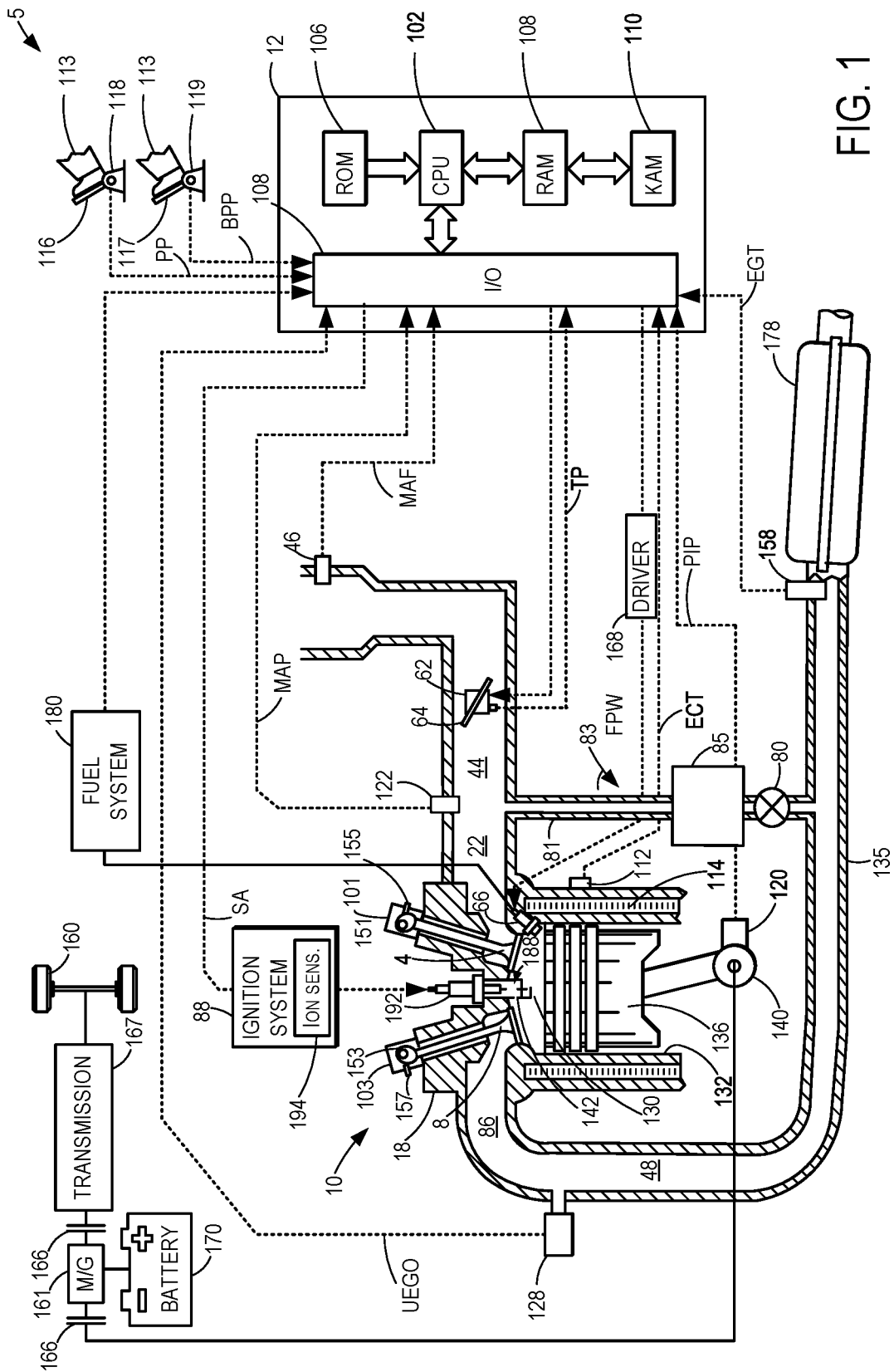
FIG. 1 shows a schematic depiction of a cylinder configuration in an engine system of a vehicle.
Figure 2:
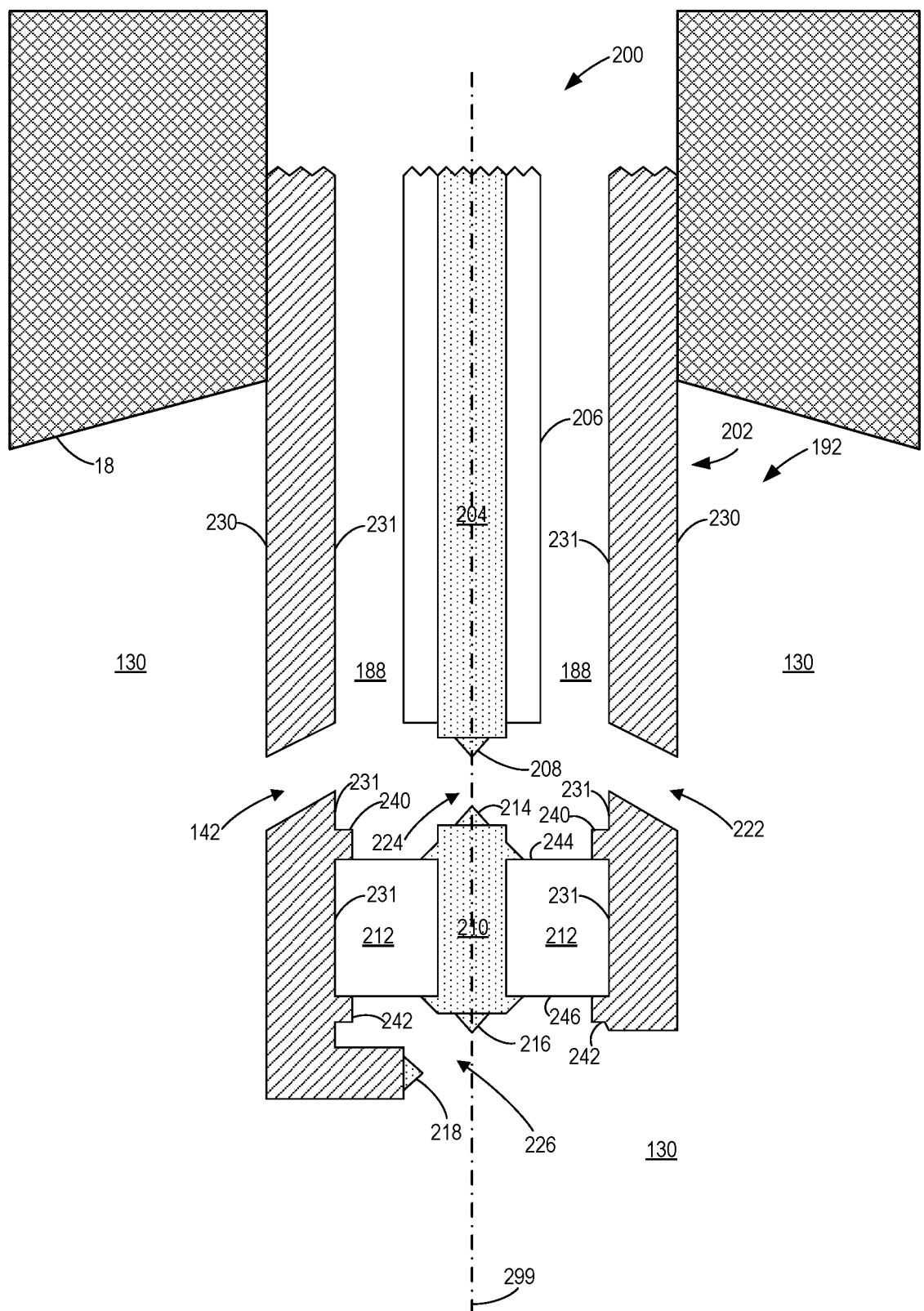
FIG. 2 shows a detailed view of a series gap igniter coupled to the cylinder of FIG. 1.
Figure 5:
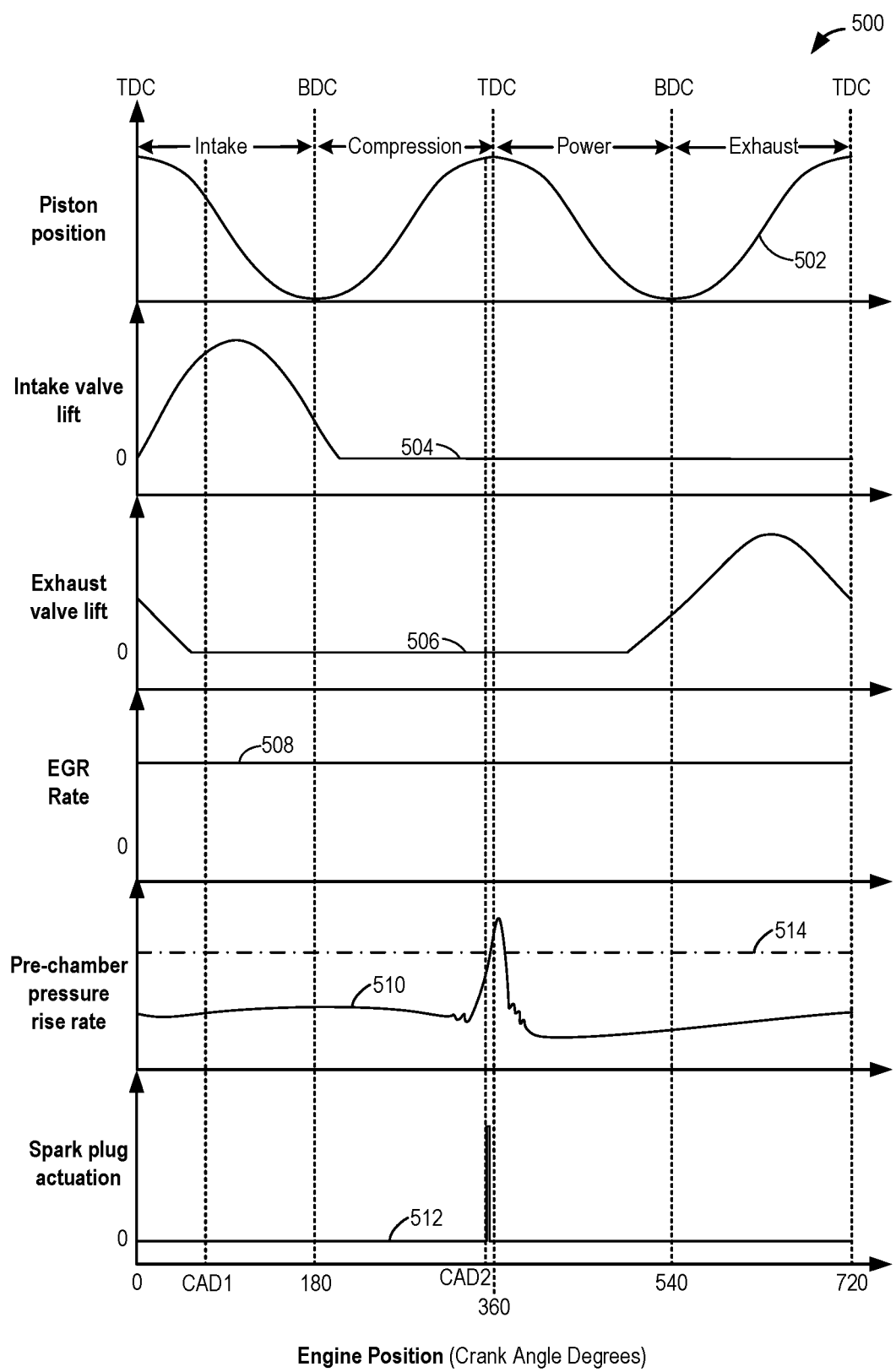
FIG. 5 shows example cylinder valve, spark, and air fuel ratios (AFRs) for operating a cylinder with pre-chamber ignition.
Figure 6:
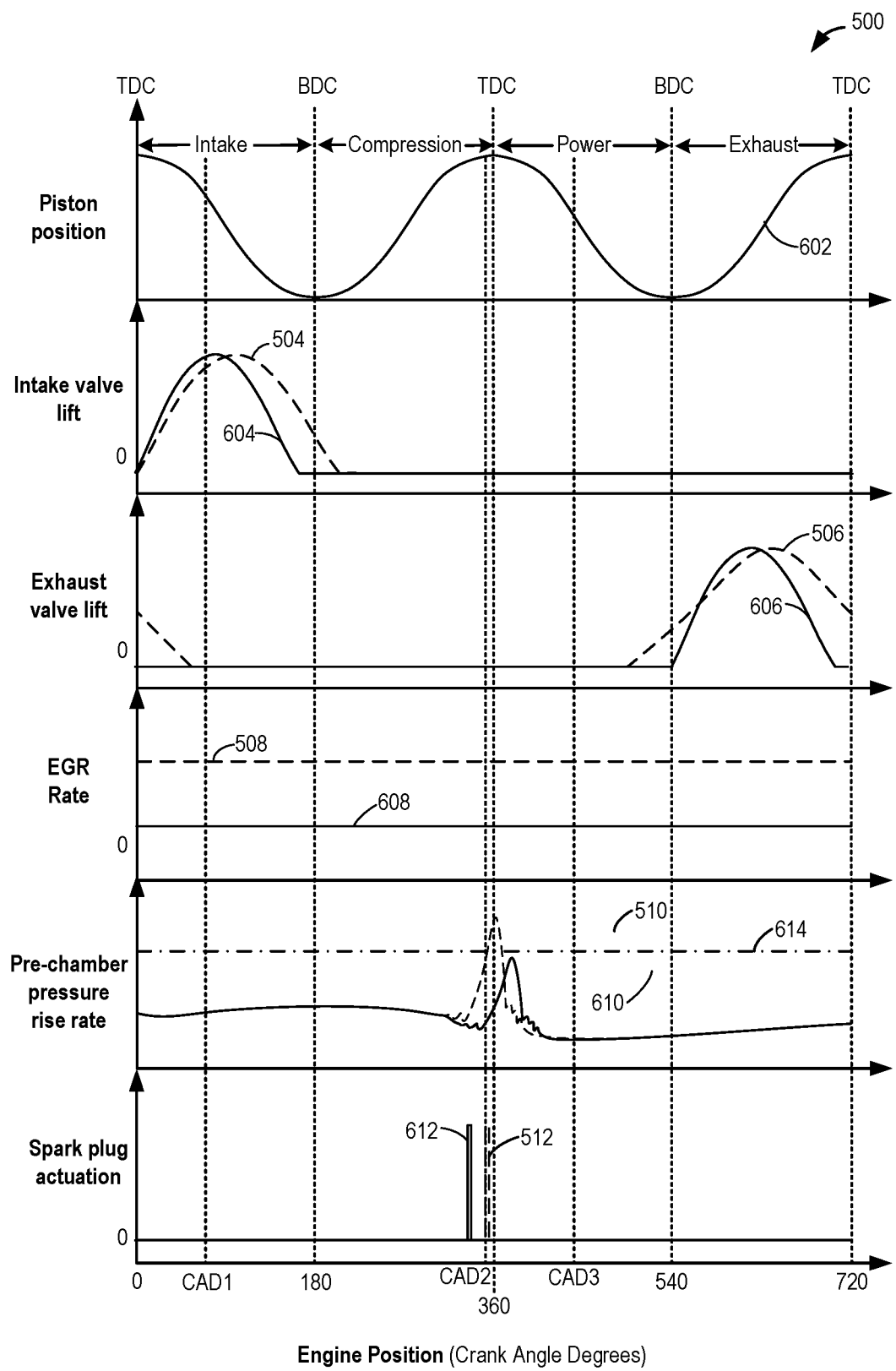
FIG. 6 shows example cylinder valve, spark, and AFRs for operating a cylinder with main chamber spark ignition.
Figure 7:
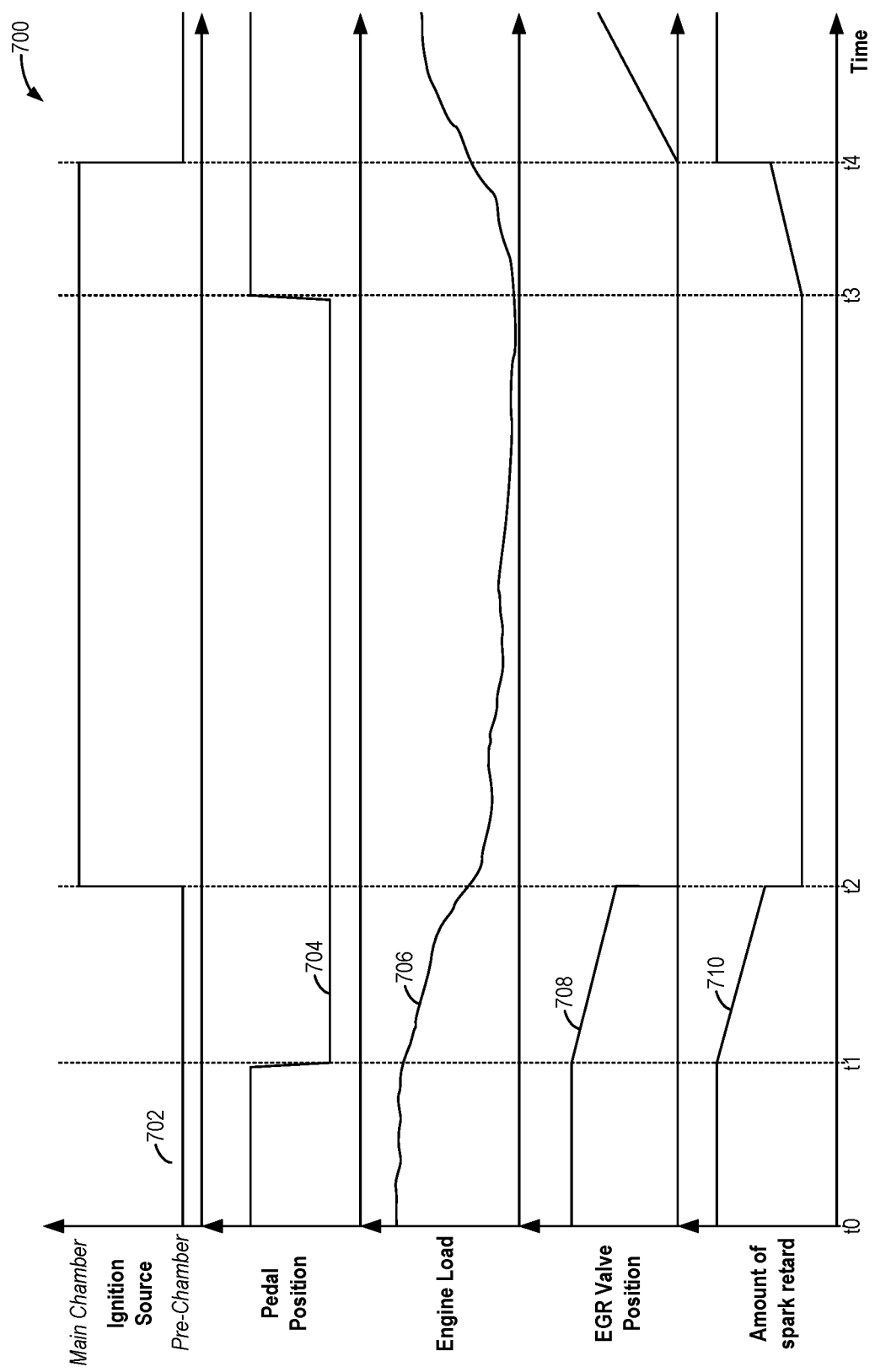
FIG. 7 shows a prophetic example timeline for adjusting engine operation to transition an engine having a series gap igniter and a passive pre-chamber system between ignition sources based on an engine load.

The following description relates to systems and methods for an engine having a passive pre-chamber system and a series gap igniter. The engine may have a plurality of cylinders, each having a cylinder configuration including a series gap igniter, as shown in FIG. 1. The series gap igniter may include two spark gaps in series and may further include a passive pre-chamber, as shown in FIG. 2. The series gap igniter may be electrically coupled to an ignition system according to the wiring diagram shown in FIG. 3, and may also be configured for ion sensing across the two spark gaps during cylinder operation. For example, a controller may adjust fueling, air supply, and spark timing in order to adjust cylinder parameters for pre-chamber ignition and main chamber spark ignition based on a signal from the ion sensor coupled to the series gap igniter (e.g., engine load, engine temperature, and cylinder AFR), such as according to the method of FIG. 4. FIG. 5 shows example intake and exhaust valve, spark actuation, pressure rise rate (e.g., measured via ion sensing) and EGR rate of a cylinder operating with pre-chamber ignition, in which pre-chamber combustion provides an ignition source, while FIG. 6 shows example intake and exhaust valve, spark actuation, pressure rise rate (e.g., measured via ion sensing) and fuel injection amount of a cylinder operating with main chamber spark ignition, in which an ignition spark provides an ignition source. A prophetic example timeline illustrating transitioning between pre-chamber ignition and main chamber spark ignition to increase combustion stability and cylinder efficiency is shown in FIG. 7.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view, intake valve 4 and exhaust valve 8 are located at an upper region of combustion chamber 130, and may be coupled to a cylinder head 18. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO, a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load (as estimated via an accelerator pedal position sensor 118 and a brake pedal position sensor 119), engine speed (as estimated via a crankshaft acceleration sensor), engine temperature (as estimated via an engine coolant temperature sensor), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a source1 that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output. Further, in some examples, in order to adjust cylinder dilution, a variable valve train may be adjusted.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85

(which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, cylinder 130 includes a series gap igniter 192 coupled to cylinder head 18 for initiating combustion, shown in more detail in FIG. 2. Series gap igniter 192 includes at least two spark gaps and further includes an internal cavity referred to herein as a passive pre-chamber 188. A first spark gap is positioned in the passive pre-chamber, and a second spark gap is exterior to passive pre-chamber 188. Further, the walls of series gap igniter 192, which enclose passive pre-chamber 188, may include a plurality of openings, such as an orifice 142 shown in FIG. 1. Orifice 142 provides an orifice between passive pre-chamber 188 and cylinder 130, fluidically coupling the passive pre-chamber to an interior of cylinder 130. The interior of cylinder 130 may be referred to herein as a main chamber. Thus, during some conditions, gases may flow between the interior of series gap igniter 192 (e.g., passive pre-chamber 188) and the interior of cylinder 130 (e.g., the main chamber of cylinder 130). For example, gases (e.g., air, fuel, and/or residual combustion gases) may flow through orifice 142 with a directionality and rate based on a pressure difference across orifice 142 (e.g., between passive pre-chamber 188 and the interior of cylinder 130). In some conditions, such as while operating with pre-chamber ignition, orifice 142 (along with any other openings in the series gap igniter) may also provide an ignition flame to cylinder 130, as will be elaborated below. In some conditions, such as while operating with main chamber spark ignition, a second spark gap facing the main chamber of cylinder 130 may provide an ignition spark for combustion in cylinder 130, as will be elaborated below.

Turning briefly to FIG. 2, a detailed partial view 200 of series gap igniter 192 introduced in FIG. 1 is shown, with like components numbered the same as in FIG. 1. View 200 is a cross-sectional view of series gap igniter 192 coupled to cylinder head 18 of cylinder 130. As shown in FIG. 2, series gap igniter 192 includes pre-chamber walls 202, which may form a substantially cylindrical tube with a central axis 299. In particular, pre-chamber walls 202 may include an exterior surface 230 and an interior surface 231. Central axis 299 may be perpendicular to a surface of piston 136 and parallel to cylinder walls 132 of FIG. 1, for example. Further, an exterior surface 230 of the pre-chamber walls 202 may be disposed in main combustion chamber 130, and may be directly or indirectly coupled to an electrical ground. As an example, a ground electrode tip 218 may be coupled to the external surface 230 of the pre-chamber walls 202 and positioned within the main combustion chamber. In the example shown, ground electrode tip 218 is not aligned with central axis 299 (e.g., ground electrode tip 218 is offset from central axis 299).

Series gap igniter 192 further includes an upper electrode 204 encased in insulation 206. Upper electrode 204 may be a cylindrical electrode positioned to be coaxial with axis 299, and insulation 206 may be a hollow cylinder coaxial with 299. An inner radius of insulation 206 may be sized to receive upper electrode 204, and an outer radius of insulation 206 may be smaller than an inner radius of pre-chamber walls 202. Further, an inner radius of insulation 206 may be approximately equal to an outer radius of upper electrode 204 so that an inner surface of insulation 206 is in direct contact with an outer surface of upper electrode 204. Further, a radial gap between pre-chamber walls 202 and insulation 206 may at least partially define a hollow annular cavity forming passive pre-chamber 188. As such, passive pre-chamber 188 includes an internal volume of series gap igniter 192. An upper electrode tip 208 maybe coupled to upper electrode 204 at a distal end of upper electrode (e.g., away from an attachment point at cylinder head 18), and may be positioned in passive pre-chamber 188 along axis 299. Further, upper electrode 204 may be positioned entirely within passive pre-chamber 188.

Series gap igniter 192 further includes a lower electrode 210 encased in insulation 212, the lower electrode 210 coaxial with upper electrode 204. Lower electrode 210 may be a cylindrical electrode positioned to be coaxial with axis 299, and may be positioned vertically lower relative to upper electrode 204 with respect to the piston and with respect to gravity. Insulation 212 may be a hollow cylinder coaxial with axis 299, for example, and an outer radius of insulation 212 may be sized to be approximately equal to the inner radius of pre-chamber walls 202, such that an outer surface of insulation 212 is in face-sharing contact with the interior surface 231 of pre-chamber walls 202. Insulation 212 may be held in place by an upper lip 240, which may have an inner radius less than the inner radius of pre-chamber walls 202 and extend radially around a top surface 244 of insulation 212. Insulation 212 may be further held in place by a lower lip 241, which may have an inner radius less than the inner radius of pre-chamber walls 202 and extend radially around a bottom surface 246 of insulation 212. Further, the inner radius of insulation 212 may be sized to receive lower electrode 210. Lower electrode 210 includes a first lower electrode tip 214, which may be positioned in passive pre-chamber 188 along central axis 299, and a second lower electrode tip 216, which may be positioned on an exterior surface of series gap igniter 192 along central axis 299. As such, upper electrode tip 208, first lower electrode tip 214, and second lower electrode tip 216 are aligned along the central axis of the series gap igniter. Further, lower electrode 210 extends between the interior of pre-chamber 188 and the exterior of pre-chamber 188. For example, a first end of lower electrode 210 including first lower electrode tip 214 is positioned internal to passive pre-chamber 188, and a second end of lower electrode 210 including second lower electrode tip 216 is positioned external to passive pre-chamber 188.

Thus, a first spark gap 224 is located in passive pre-chamber 188 between upper electrode tip 208 and first lower electrode tip 214. Further, a second spark gap 226 is exterior to passive pre-chamber 188, positioned between second lower electrode tip 216 and ground electrode tip 218. Further, the pre-chamber walls 202 may include a plurality of openings, including orifice 142 and an orifice 222. The outer surface 230 of pre-chamber walls 202 may be surrounded by and in contact with gases in main combustion chamber 130, while the interior surface 231 of pre-chamber walls 202 may be surrounded by and in contact with gases in the passive pre-chamber 188. The plurality of openings may fluidically couple the internal volume of series gap igniter 192 (e.g., pre-chamber 188) to the main chamber 230. Further, in an alternative embodiment, a second ground strap may be incorporated into the series gap igniter so that the electrical circuit is completed between the series spark gaps via a conductive element that is electrically isolated.

Returning now to FIG. 1, an ignition system 88 may provide an ignition spark to series gap igniter 192 in response to a spark advance signal SA from controller 12, under select operating sources. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When series gap igniter 192 is actuated, the air-fuel mixture within the passive pre-chamber may combust, the increased pressure of combustion sending jets of flame into cylinder 130 via the plurality of openings in the pre-chamber walls, including orifice 142. The plurality of openings may be arranged such that the jets of flame are evenly distributed in cylinder 130. The jets of flame may ignite the air-fuel mixture in cylinder 130, causing combustion. Providing ignition to the air-fuel mixture in the cylinder via jets of flame from the pre-chamber may be referred to herein as pre-chamber ignition.

However, during some conditions, such as low load conditions, the air-fuel mixture within the passive pre-chamber may not combust when series gap igniter 192 is actuated, and thus the external spark gap (e.g., second spark gap 226 of FIG. 2) may ignite the air-fuel mixture within the main chamber. Providing ignition to the air-fuel mixture in the cylinder via a spark in the cylinder may be referred to herein as main chamber spark ignition, or merely spark ignition. After combustion, a mixture of exhaust gases from both passive pre-chamber 188 and cylinder 130 may be exhausted from cylinder 130 to exhaust manifold 48 via opening of exhaust valve 8.

Further, ignition system 88 may be configured for ion sensing via series gap igniter 192. In particular, in response to the spark signal from the controller, ignition system 88 may apply a high-voltage bias across series gap igniter 192 to enable ionization sensing. The high-voltage bias may be applied across the spark gap and may be applied prior to ignition coil dwell. During selected conditions, an additional high-voltage bias may be applied during ignition coil dwell. Ignition system 88 may include one or more ignition coils and other circuitry/electronics to actuate the associated spark plug and provide ion sensing, such as an ion sensing module 194. For example, by applying the high-voltage bias across series gap igniter 192 after actuation, the ion sensing module 194 may monitor an ionization current across each of the first spark gap and the second spark gap due to gas ionization in the cylinder during combustion. The ionization current may be monitored by controller 12 and may be used to estimate cylinder operating conditions such as a cylinder pressure, a cylinder pressure rise rate, and a burn rate in the cylinder. Charging of the ignition coil may be powered by a high-voltage power supply (not shown) or by battery voltage. Use of a boosted voltage provided by a high-voltage power supply may provide various advantages, such as reducing ignition coil charge time and dwell time, which generally allows greater ignition timing flexibility and/or a longer ionization sensing period. In one embodiment, each series gap igniter of the engine includes a dedicated coil and associated electronics to provide sparking and ion sensing. Alternatively, a single ignition module may be associated with multiple series gap igniter with ionization sensing provided using a power pair arrangement to reduce the number of necessary control lines. In other examples, the ion sensing module may include a stand-alone ion sensor.

Engine 10 may be controlled at least partially by controller 12 and by input from a vehicle operator 113 via an accelerator pedal 116 and accelerator pedal position sensor 118 and via a brake pedal 117 a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 46, an engine coolant temperature signal (ECT) from a temperature sensor 112 coupled to coolant sleeve 114, signal UEGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, spark plug ionization current from an ionization sensor of ionization sensing module 194, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, series gap igniter 192, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 4.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), igniter, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Figure 3:
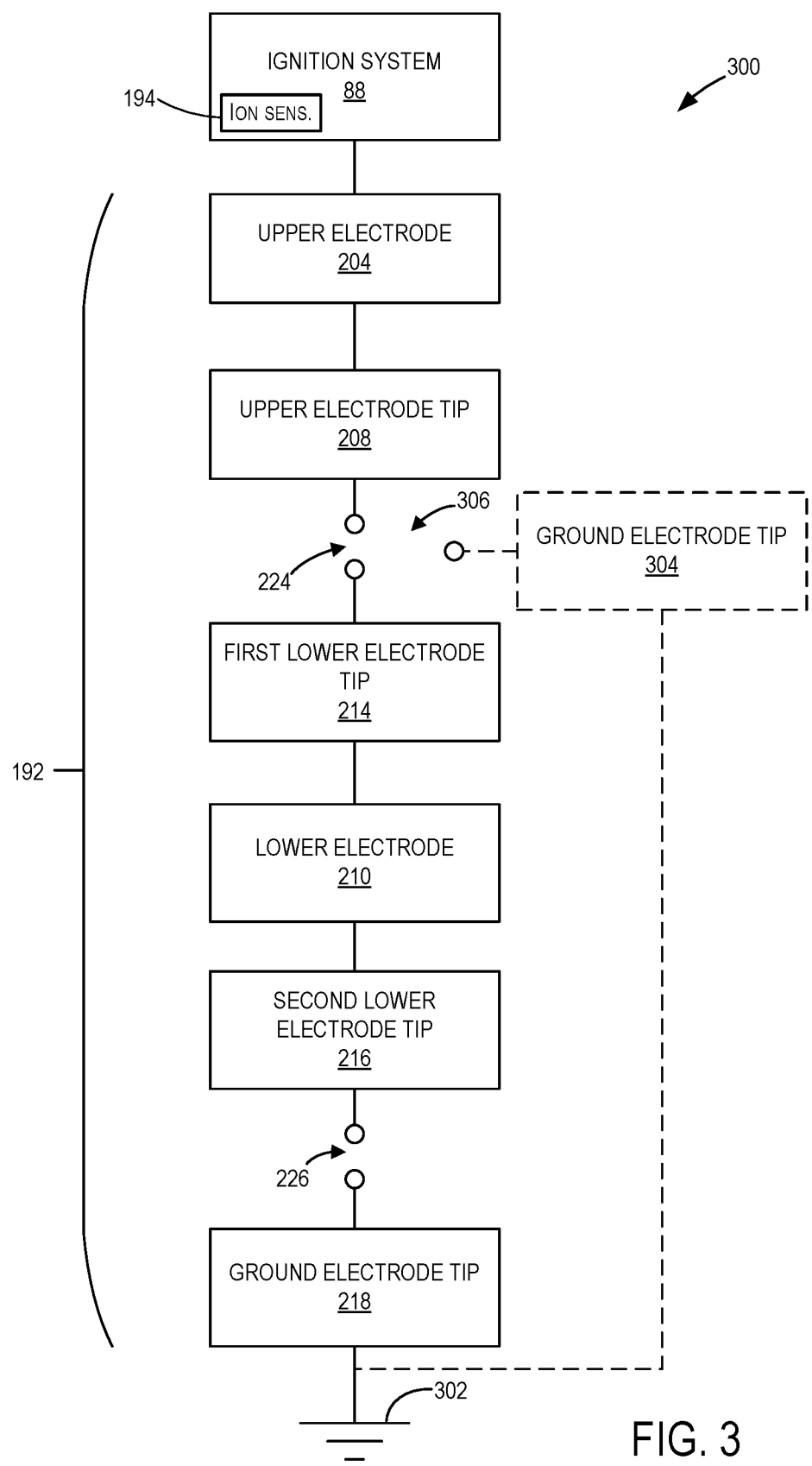
FIG. 3 shows a view of an example wiring diagram for the series gap igniter of FIG. 2.

Next, FIG. 3 shows a wiring diagram for operating a series gap igniter, such as series gap igniter 192 of FIGS. 1-2, in an engine system. FIG. 3 shows a schematic depiction of several components of series gap igniter 192 introduced in FIG. 2, including upper electrode 204, upper electrode tip 208, lower electrode 210, first lower electrode tip 214, second lower electrode tip 216, and ground electrode tip 218. Further, FIG. 3 also includes ignition system 88 of FIG. 1. Series gap igniter 192 is powered by ignition system 88, which may include one or more ignition coils and ion sensing module 194, as described above with respect to FIG. 1. In particular, ignition system 88 is coupled to upper electrode 204 of series gap igniter 192. Further, upper electrode 204 is directly coupled to upper electrode tip 208, and upper electrode tip 208 is coupled to first lower electrode tip 214 via first spark gap 224. First lower electrode tip 214 is directly coupled to lower electrode 210. Thus, upper electrode 204 and lower electrode 210 are electrically coupled only when a voltage differential between upper electrode tip 210 and first lower electrode tip 214 is higher than a first threshold voltage differential sufficient to cross first spark gap 224.

As shown in FIG. 2, first spark gap 224 may be positioned in passive pre-chamber 188 of cylinder 130. As an example, when the space between upper electrode tip 210 and first lower electrode tip 214 (e.g., first spark gap 224) is occupied by a pre-chamber air-fuel mixture, the first threshold voltage differential may be a breakdown voltage of the pre-chamber air-fuel mixture. A breakdown voltage of a material may be defined as the applied voltage at while the material becomes electrically conductive and acts as a conduit for current. Breakdown voltage may vary as a function of pressure, a distance between terminals, and physical properties of the material. Thus, the breakdown voltage of the pre-chamber air-fuel mixture may be the voltage at which the pre-chamber air-fuel mixture becomes electrically conductive and acts as a conduit for electrical current flowing between the upper electrode tip 210 and the first lower electrode tip 214. When the voltage differential between upper electrode tip 210 and first lower electrode tip 214 exceeds the first threshold voltage differential (e.g., when the voltage differential between upper electrode tip 210 and first lower electrode tip 214 exceeds the breakdown voltage of the air-fuel mixture in first spark gap 224), a current may flow across the first spark gap 224, generating a first spark. Thus, in some examples, when passive pre-chamber 188 contains an air-fuel mixture while a voltage differential greater than the first threshold voltage differential is applied to first spark gap 224, the first spark across first spark gap 224 may ignite the pre-chamber air-fuel mixture.

Further, lower electrode 210 is directly coupled to second lower electrode tip 216, and second lower electrode tip 216 is coupled to ground electrode tip 218 via second spark gap 226. Ground electrode tip 218 is directly coupled to an electrical ground 302. For example, ground electrode tip 218 may be coupled to pre-chamber walls 202 of FIG. 2, which may be grounded. Thus, lower electrode 210 is electrically coupled to electrical ground 302 only when the voltage differential between second lower electrode tip 216 and ground electrode tip 218 is higher than a second threshold voltage differential sufficient to cross second spark gap 226. As shown in FIG. 2, second spark gap 226 may be positioned in the main combustion chamber of cylinder 130. As an example, when the space between second lower electrode tip 216 and ground electrode tip 218 (e.g., second spark gap 226) is occupied by an air-fuel mixture, the second threshold voltage differential may be a breakdown voltage of the air-fuel mixture in the main combustion chamber. In particular, when the voltage differential between second lower electrode tip 216 and ground electrode tip 218 exceeds the second threshold voltage differential (e.g., when the voltage differential between second lower electrode tip 216 and ground electrode tip 218 exceeds the breakdown voltage of the air-fuel mixture in second spark gap 226), a current may flow across the second spark gap 226, generating a second spark. As an example, when the main combustion chamber contains an air-fuel mixture, applying a voltage differential greater than the second threshold voltage differential across second spark gap 226 may generate a spark and ignite the air-fuel mixture in the main combustion chamber. Further, after generating a spark via the series gap igniter, ignition system 88 may apply a high-voltage bias across each of the first spark gap 224 and the second spark gap 226 for ion sensing. For example, ion sensing module 194 may monitor an ionization current across each of first spark gap 224 and second spark gap 226 after actuation in order to estimate the cylinder pressure and the cylinder pressure rise rate.

In this way, series gap igniter 192 is coupled to ignition system 88 via a direct connection between ignition system 88 and upper electrode 204, while series gap igniter 192 is connected to ground via a direct connection between ground electrode tip 218 and electrical ground 302. When ground electrode tip 218 is connected to electrical ground 302 and ignition system 88 provides a current to upper electrode 204 (e.g., when the series gap igniter is actuated), the voltage differential between upper electrode 204 and lower electrode 210 may exceed the first threshold voltage differential (e.g., the breakdown voltage of an air-fuel mixture in first spark gap 224), and thus current may flow across the first spark gap 224 from upper electrode 204 to lower electrode 210, generating a first spark in the pre-chamber. Further, current flowing from upper electrode 204 to lower electrode 210 may increase a voltage differential between lower electrode 210 and ground electrode tip 218 until the voltage differential between lower electrode 210 and ground electrode tip 218 exceeds the second threshold voltage differential (e.g., the breakdown voltage of an air-fuel mixture in second spark gap 226), causing current to flow across the second spark gap 226 from lower electrode 210 to ground electrode tip 218, which may generate a second spark in the main chamber of the cylinder. Further, by including ion sensing module 194, an ionization current across each of the first spark gap 224 and the second spark gap 226 may be monitored, such that the cylinder pressure rise rate may be estimated by the controller (e.g., controller 12 of FIG. 1).

In the embodiment shown in FIG. 3, the first spark gap 224 and the second spark gap 226 are in series, such that both the first spark gap 224 and the second spark gap 226 generate a spark when the series gap igniter is actuated. However, in some embodiments of the present disclosure, series gap igniter 192 may optionally include a ground electrode tip 304 inside the pre-chamber, ground electrode 304 tip directly coupled to electrical ground 302. Thus, series gap igniter 192 may include a third spark gap 306 located between upper electrode tip 208 and ground electrode tip 304. Further, in this example, each of the first spark gap 224, the second spark gap 226, and the third spark gap 306 may be positioned such that, during high load operation (e.g., when cylinder pressure is high) a spark only occurs across the third spark gap 306 and does not occur across each of the first spark gap 224 and the second spark gap 226. For example, the breakdown voltage of an air-fuel mixture may change based on cylinder pressure. As an example, each of the first spark gap 224, the second spark gap 226, and the third spark gap 306 may be positioned such that, when cylinder pressure exceeds a threshold cylinder pressure, a voltage differential between ignition system 88 and electrical ground 302 is less than the breakdown voltage across each of the first spark gap 224 and the second spark gap 226, and is greater than the breakdown voltage across the third spark gap 306. During such conditions, a spark may occur only across the third spark gap 306 in the pre-chamber of series gap igniter 192 and not across first spark gap 224 or second spark gap 226.

As shown in FIGS. 1-3, a series gap igniter (e.g., a combined pre-chamber and main chamber spark plug) may include at least two spark gaps wired in series, such that actuating an ignition coil coupled to the series gap igniter generates a spark across each of the at least two spark gaps. Further, as shown in FIG. 2, when the series gap igniter is coupled to a cylinder, a first spark gap (e.g., first spark gap 224) may be located in a passive pre-chamber (e.g., passive pre-chamber 188) of the series gap igniter while a second spark gap (e.g., spark gap 226) may be located in a main chamber of the cylinder, external to the passive pre-chamber. In order to provide reliable ignition over a range of engine operating conditions, the cylinder may adjust cylinder operation based on an ignition source (e.g., pre-chamber ignition or main chamber spark ignition), as determined based on a signal from an ion sensing module coupled to the series gap spark plug (e.g., ion sensing module 194). In particular, a relationship between an ionization current across the series gap igniter after spark discharge (e.g., as measured by the ion sensing module) and a cylinder pressure rise rate may be used to determine whether the cylinder is operating with pre-chamber ignition or main chamber spark ignition (e.g., spark ignition). For example, a change in ionization current measured by the series gap igniter may be used to infer a cylinder pressure rise rate amount and a cylinder pressure rise rate time (e.g., when the cylinder pressure rise rate increases after spark discharge). As such, changes in the pressure rise rate in the cylinder may be used to determine which of pre-chamber ignition and cylinder ignition is providing ignition to the cylinder. For example, pre-chamber ignition may be associated with at least one of a higher pressure rise rate and an earlier pressure rise rate. Further, main chamber spark ignition (e.g., spark ignition) may be associated with at least one of a lower pressure rise rate and a later pressure rise rate.

Thus, to increase combustion stability and engine efficiency over a range of operating conditions, cylinder operation may be adjusted based on a signal from the ion sensing module in order to transition between cylinder settings calibrated for pre-chamber ignition, in which jets of flame and hot gas from combustion in the passive pre-chamber ignite an air-fuel mixture in the cylinder, and cylinder settings calibrated for cylinder ignition, in which an ignition spark directly ignites the air-fuel mixture in the cylinder. For example, adjusting cylinder operation for pre-chamber ignition may include operating at a higher rate of dilution with external EGR and/or internal residual and/or a lean air-fuel ratio (AFR), for example. As another example, adjusting cylinder operation for main chamber spark ignition may include operating at a lower rate of dilution with external EGR and/or internal residual and/or with a stoichiometric or rich air-fuel ratio (AFR). As yet another example, adjusting cylinder operation for pre-chamber ignition may include retarding spark relative to main chamber spark ignition.

Figure 4:
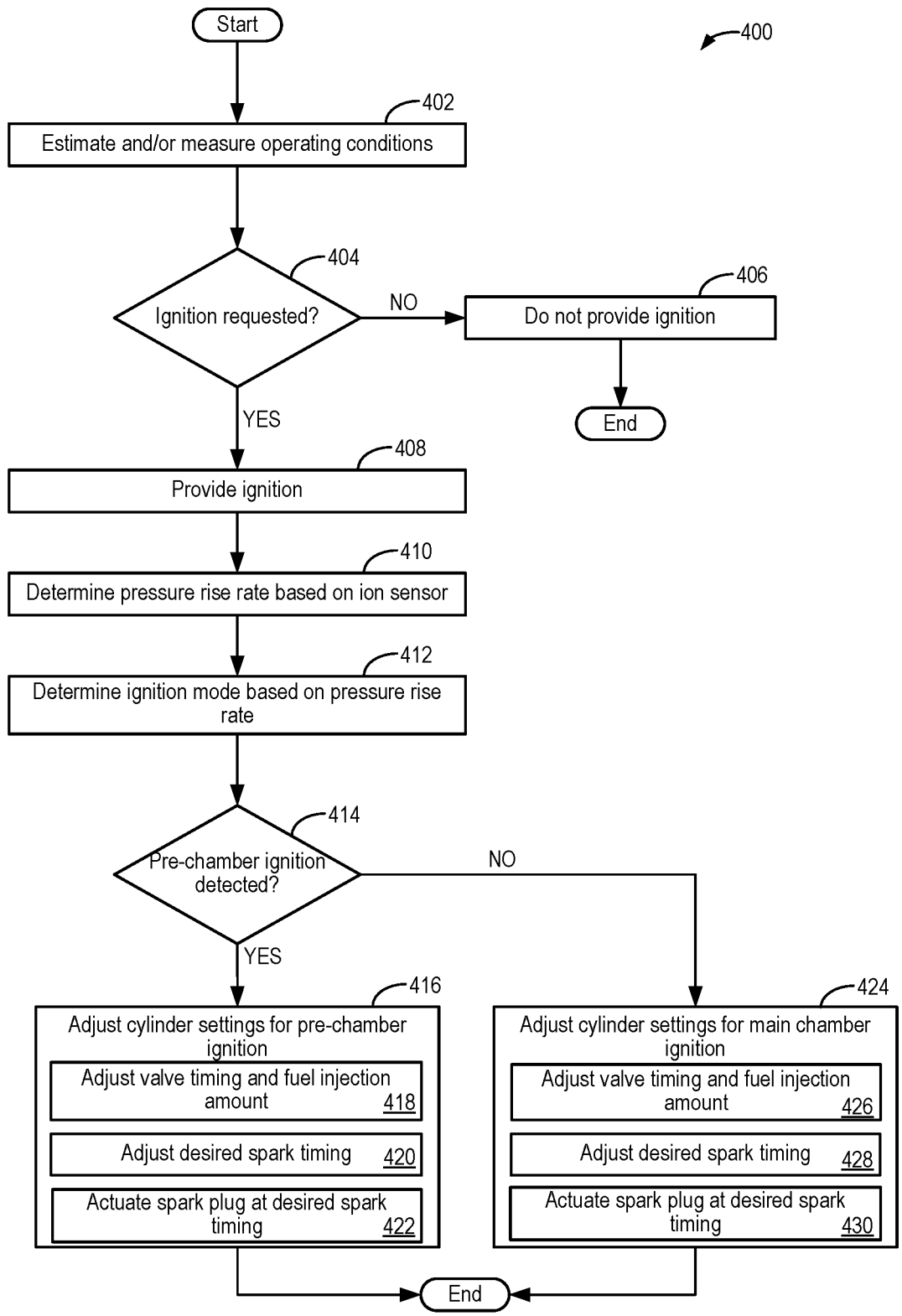
FIG. 4 shows an example method for operating an engine having a series gap igniter and a pre-chamber system in different ignition sources based on operating conditions.

Therefore, FIG. 4 shows an example method 400 for adjusting cylinder settings for a cylinder with a series gap igniter (e.g., series gap igniter 192 shown in FIGS. 1-3) based on an ignition source, which may be determined based on a signal from an ion sensing module. As illustrated in FIGS. 1 and 2, the series gap igniter may be located in a clearance volume of the cylinder and may include a first spark gap within a passive pre-chamber and a second spark gap in the clearance volume. As such, method 400 will be described with respect to the cylinder configuration shown in FIG. 1 and the series gap igniter configuration shown in FIG. 2, although method 400 may be applied in other systems that include a series gap igniter. Instructions for carrying out method 400 may be executed by a controller, such as controller 12 of FIG. 1, based on instructions stored on a memory of the controller and in conjunction with signals received from sensors of the engine system, such as the sensors described above with reference to FIG. 1 (e.g., mass air flow sensor 46 and ion sensing module 194). The controller may employ engine actuators of the engine system to adjust engine operation according to the methods described below. Method 400 will be described with respect to a single cylinder including a pre-chamber, although method 400 may be performed substantially simultaneously for a plurality of cylinders in a multi-cylinder engine.

At 402, method 400 includes estimating and/or measuring operating conditions. The operating conditions may include, for example, vehicle speed, engine speed, engine load, cylinder AFR, exhaust gas AFR, engine temperature, an accelerator pedal position, a brake pedal position, a throttle position, an amount of external EGR, and an exhaust gas temperature. The operating conditions may be measured by one or more sensors communicatively coupled to the controller or may be inferred based on available data. For example, the controller may estimate the engine load by inputting a throttle position and a mass air flow (MAF) sensor reading into one or more look-up tables, maps, or functions, which may output engine load. As another example, the exhaust gas temperature may be measured by an exhaust gas temperature sensor, such as exhaust gas temperature sensor 148 of FIG. 1. As yet another example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As yet another example, the amount of external EGR may be determined based on a position of an EGR valve, such as EGR valve 80 of FIG. 1.

At 404, method 400 includes determining whether ignition is requested. In some examples, ignition may be requested during nominal engine operation to provide an ignition source for combusting an air-fuel mixture in the cylinder during each combustion cycle. A combustion cycle (e.g., a cylinder cycle) may refer to a four stroke movement of a piston of the cylinder, the four strokes including an intake stroke, a compression stroke, a power stroke, and an exhaust stroke. When ignition is requested, a firing event may occur during the end of the compression stroke. Further, the ignition may be provided by the series gap igniter. In some examples, the ignition source may be an ignition spark in the main chamber of the cylinder, while in other examples, the ignition source may be jets of hot gas and flame from a combustion in the passive pre-chamber of the series gap igniter.

If the controller determines that ignition is not requested at 404, method 400 proceeds to 406 and includes not providing ignition. For example, ignition may not be requested while engine combustion is discontinued. For example, engine combustion may be discontinued while the engine is shut down or during a fuel-cut condition, such as when cylinder fueling is shut off while the vehicle speed decreases. In another example, ignition may not be requested when ignition has already been provided during the combustion cycle. Not providing ignition may include not actuating the series gap igniter. For example, the controller may adjust a control signal to the ignition system of the engine such that the series gap igniter is not activated. Further, because an ignition source is not provided, an air-fuel mixture in the cylinder may not be ignited, and power may not be provided to the engine. After 406, method 400 may end.

If the controller determines that ignition is requested at 404, method 400 proceeds to 408 and includes providing ignition via the series gap igniter. For example, the controller may adjust an actuation signal to the series gap igniter so that the series gap igniter provides an ignition spark to the cylinder. While providing ignition, the controller may monitor the ion sensing module in order to monitor gas ionization during the combustion cycle. Based on engine operating conditions including engine load and engine temperature, in some examples the series gap igniter may initiate combustion in the cylinder via an ignition spark in the main chamber of the cylinder, while in other examples, the ignition source may be jets of hot gas and flame from a combustion in the passive pre-chamber of the series gap igniter. For example, although a spark may occur both in the pre-chamber and the main chamber, when engine load is low and/or engine temperature is low, the series gap igniter may initiate combustion in the cylinder via an ignition spark in the main chamber, and the combustion in the passive pre-chamber may not occur, or may not be robust enough to produce hot gas and flame for initiating combustion in the cylinder. Further and when engine load and/or temperature is high, the series gap igniter may initiate combustion in the cylinder via jets of hot gas and flame from the combustion in the passive pre-chamber, and the spark in the cylinder may not significantly affect combustion in the cylinder.

At 410, method 400 includes determining a pressure rise rate based on the signal from the ion sensing module. In particular, the pressure rise rate may be a rate of pressure increase in the cylinder following the ignition event provided at 408. Further, a relationship between gas ionization measured across the series gap igniter and the pressure rise rate in the cylinder may be substantially proportional. As such, the pressure rise rate in the cylinder may be determined based on the gas ionization measured across the series gap igniter. Further, because the series gap igniter includes two spark gaps, the measured ionization current may be a composite of gas ionization in the cylinder and gas ionization in the pre-chamber. In order to determine the pressure rise rate in the cylinder, the controller may input the signal from the ion sensing module into one or more look-up tables, maps, or functions, which may output the pressure rise rate in the cylinder.

At 412, method 400 includes determining the ignition source based on the pressure rise rate, as determined at 410. For example, the pressure in the cylinder may increase faster, and thus the pressure rise rate may be larger, when pre-chamber ignition (e.g., the first spark gap) provides the ignition source relative to spark ignition in the main chamber (e.g., the second spark gap) due to an increased burn rate created via the jets of hot gas and flame created via pre-chamber ignition. Therefore, the controller may determine that pre-chamber ignition is the ignition source responsive to the pressure rise rate being higher than a threshold pressure rise rate. The threshold pressure rise rate may be a non-zero, pre-determined pressure rise rate associated with the faster cylinder pressure increases associated with pre-chamber ignition. Conversely, the controller may determine that main chamber spark ignition is the ignition source responsive to the pressure rise rate being less than the threshold rise rate.

Further, the faster burn rate from pre-chamber ignition may result in the pressure rise rate increasing earlier in the combustion cycle than main chamber spark ignition. Therefore, as another example, the controller additionally or alternatively may determine that pre-chamber ignition is the ignition source responsive to an increase in the pressure rise rate occurring earlier in the combustion cycle, such as within a threshold number of crank angle degrees from the ignition event. The threshold number of crank angle degrees may be a non-zero, pre-determined number of crank angle degrees that separates the faster burn rate produced through pre-chamber ignition from the slower burn rate produced through spark ignition in the main chamber. Thus, the controller may conversely determine that main cylinder spark ignition is the ignition source responsive to the increase in the pressure rise rate occurring after the threshold number of crank angle degrees from the ignition event.

At 414, method 400 includes determining whether pre-chamber ignition is the ignition source at 412. If the controller determines that the ignition source is pre-chamber ignition, method 400 proceeds to 416 and includes adjusting cylinder settings for pre-chamber ignition. By adjusting the cylinder settings for pre-chamber ignition, the cylinder may be operated with settings that favor pre-chamber ignition (and not main chamber spark ignition), resulting in increased combustion stability and efficiency.

For example, adjusting cylinder settings to operate with pre-chamber ignition includes adjusting valve timings and a fuel injection amount, as indicated at 418. For example, cylinder valve and fuel injection settings and/or calibrations may be different than those for main chamber spark ignition.

Therefore, the method may include adjusting intake and exhaust valve timings, including an intake valve opening timing, closing timing, and open duration, and an exhaust valve opening timing, closing timing, and open duration. For example, the controller may input one or more engine operating conditions, such as throttle position, into one or more look-up tables, maps, or functions that are calibrated for pre-chamber ignition, which may output the intake valve timings and the exhaust valve timings for operating with pre-chamber ignition with the given engine operating conditions. In some examples, the controller may adjust a current intake valve setting and a current exhaust valve setting to provide the determined intake valve timings and the determined exhaust valve timings by adjusting a position of one or more camshafts relative to the engine crankshaft. For example, the controller may generate a control signal that adjusts the camshaft position based on the desired valve timings. As another example, the intake valve and the exhaust valve may be electrically actuated, and the controller may actuate the intake valve and the exhaust valves at the determined timings by sending a control signal to one or more electronic actuators controlling the intake valve(s) and the exhaust valve(s). In some examples, the intake and exhaust valve calibrations for operating with pre-chamber ignition may generally include settings for increasing dilution via increased valve overlap, such as with an earlier intake valve opening timing and/or a later exhaust valve closing timing. For example, the intake valve opening timing may be earlier while operating with pre-chamber ignition relative to main chamber spark ignition, which may increase an amount of air inducted into the cylinder. As another example, the exhaust valve opening timing may be later while operating with pre-chamber ignition relative to main chamber spark ignition. As another example, the controller may adjust the intake valve closing time based on engine load while operating with pre-chamber ignition. In particular, the controller may adjust the intake valve closing time to be closer to BDC in order to increase an effective compression ratio of the cylinder due to faster combustion and increased knock behavior in the cylinder, for example. Further still, the exhaust valve timing may be adjusted to increase an amount of valve overlap between the intake valve and exhaust valve while operating with pre-chamber ignition in order to increase an amount of internal EGR within the cylinder, for example.

In some examples, the fuel injection amount may be adjusted from a current fuel injection amount, such as by increasing or decreasing the amount of fuel. The controller may determine the amount of fuel to inject into the cylinder based on a desired AFR of the cylinder and an amount of air inducted into the cylinder. For example, the controller may input the desired cylinder AFR and the amount of air inducted into the cylinder into one or more look-up tables, functions, or maps, which may output a desired fuel amount to inject that will achieve the desired AFR in the cylinder. Further, an injection pressure may be adjusted to increase a burn rate and/or an ignitibility of the air-fuel mixture in the cylinder. For example, the controller may input the engine operating conditions, such as engine load and the desired AFR, into one or more look-up tables, functions, and maps that are specific to (e.g., calibrated for) pre-chamber ignition, which may output the amount of fuel to inject for operating with pre-chamber ignition with the given engine operating conditions. In particular, the determined amount of fuel may be predicted to achieve desired combustion qualities in the pre-chamber. In one example, the controller may inject the determined fuel amount by adjusting a pulse-width of the actuation signal sent to the cylinder fuel injector. In some examples, the determined amount of fuel may be injected in a single injection event, while in other examples, the determined amount of fuel may be distributed over a plurality of injection events. The injected fuel may mix with air inducted to the cylinder to form an air-fuel mixture, a portion of which may flow into the passive pre-chamber due to a pressure differential between the pre-chamber and the cylinder. As an example, the desired AFR in the cylinder during pre-chamber ignition may be lean relative to stoichiometry, and the amount of fuel injected into the cylinder during pre-chamber ignition may be adjusted (e.g., decreased) in order to achieve the lean desired AFR in the cylinder. Further, the controller may adjust other cylinder settings, such as a position of the EGR valve, while operating with pre-chamber ignition. For example, while operating with pre-chamber ignition, the controller may adjust the position of the EGR valve in order to increase a rate of EGR in the cylinder.

Adjusting the cylinder settings for pre-chamber ignition at 416 further includes adjusting a desired spark timing for pre-chamber ignition, as indicated at 420. Further, the desired spark timing may indicate a desired timing for actuating the series gap igniter (e.g., an actuation timing). Adjusting the desired spark timing (and thus the actuation timing) may include determining when to ignite the air-fuel mixture in the passive pre-chamber relative to a position of a piston of the cylinder. The desired spark timing may be shifted relative to MBT based on (e.g., as a function of) engine operating conditions in order to achieve a desired pre-chamber ignition timing, and thus, a desired cylinder ignition timing. For example, the desired spark timing may be retarded relative to MBT timing to increase an exhaust gas temperature, while the desired spark timing may be advanced relative to MBT timing to increase a torque output of the cylinder, while an absolute timing of MBT (e.g., with respect to TDC of the compression stroke) varies based on the operating conditions. Further, the desired spark timing (and thus the actuation timing) may be determined as a function of the engine operating conditions using a first actuation timing calibration while operating with pre-chamber ignition. The first actuation timing calibration may be different than a second actuating timing calibration used while operating with main chamber spark ignition, as will be elaborated below with respect to 424. For example, the first actuation timing calibration may be calibrated for pre-chamber ignition, whereas the second actuation timing calibration may be calibrated for direct spark ignition in the cylinder. As an example, the relative spark timing (e.g., with respect to MBT timing) may be different while operating with pre-chamber ignition and main chamber spark ignition for producing a same fraction of the torque delivered at MBT timing, referred to herein as a torque ratio, due to different ignition and burn rates of pre-chamber ignition versus direct spark ignition in the cylinder (e.g., main chamber spark ignition). As one illustrative example, the first actuation timing calibration may include spark timings further retarded from MBT than the second actuation timing calibration for producing a torque ratio of 0.9 (e.g., 90% of the torque delivered at MBT timing).

In one example, the controller may input one or more engine operating conditions (e.g., engine speed, engine load, the amount of external EGR, the exhaust gas temperature, desired pre-chamber AFR, and cylinder AFR) into one or more look-up tables, functions, or maps included in the first actuation timing calibration to determine the desired spark timing for the next pre-chamber ignition event. In another example, the controller may make a logical determination (e.g., regarding the desired spark timing) based on logic rules that are a function of the one or more engine operating conditions and the pre-chamber ignition calibration. As an example, the desired spark timing may occur later in the compression stroke (e.g., closer to TDC of the compression stroke) while operating with pre-chamber ignition than while operating with main chamber spark ignition. Method 400 may then end. For example, the controller may continue to monitor the ignition source based on the signal from the ion sensing module, and may continue to adjust cylinder settings based on the detected ignition source.

If the controller determines that pre-chamber ignition is not the ignition source at 414, method 400 proceeds to 422 and includes adjusting the cylinder settings for main chamber spark ignition (e.g., rather than pre-chamber ignition). Adjusting the cylinder settings for main chamber spark ignition includes adjusting the valve timings and the fuel injection amount for main chamber spark ignition, as indicated at 424. Adjusting the valve timings for main chamber spark ignition may include, for example, determining the intake and exhaust valve timings, including the intake valve opening timing, closing timing, and open duration, and the exhaust valve opening timing, closing timing, and open duration, as elaborated above at 418. For example, the controller may input one or more engine operating conditions, such as the throttle position, into one or more look-up tables, maps, or functions that are calibrated for main chamber spark ignition, which may output the intake valve timings and the exhaust valve timings for operating with main chamber spark ignition with the given engine operating conditions. In some examples, the intake and exhaust valve calibrations for operating with main chamber spark ignition may generally include decreasing cylinder dilution via decreased valve overlap, such as with a later intake valve opening timing and/or an earlier exhaust valve closing timing. For example, the controller may decrease the amount of valve overlap between the intake valve and the exhaust valve by adjusting the intake valve timing and the exhaust valve timing. As another example, the controller may adjust the intake valve closing timing to be further from BDC in order to decrease the effective compression ratio of the cylinder.

The fuel injection amount for main chamber spark ignition may include determining the amount of fuel to inject into the cylinder, such as elaborated above at 418. The controller may determine the amount of fuel to inject into the cylinder by inputting the desired cylinder AFR and the estimated amount of air inducted into the cylinder into one or more look-up tables, functions, or maps that are calibrated for main chamber spark ignition, which may output the amount of fuel to inject that will achieve the desired AFR in the cylinder for operating with main chamber spark ignition with the given engine operating conditions. As an example, the desired AFR with main chamber spark ignition may be stoichiometric, and the amount of fuel injected into the cylinder may be adjusted to achieve the stoichiometric desired AFR. As another example, the desired AFR with main chamber spark ignition may be rich relative to stoichiometry, and the amount of fuel injected into the cylinder may be adjusted to achieve the stoichiometric desired AFR. The controller may then actuate the fuel injector to inject the determined amount of fuel, as described above at 414.

Adjusting cylinder settings for main chamber spark ignition at 422 further includes determining a desired spark timing for main chamber spark ignition, as indicated at 426. Determining the desired spark timing may include determining when to generate an ignition spark in the cylinder relative to the position of the piston of the cylinder using the second actuation timing calibration. In one example, the controller may input one or more engine operating conditions (e.g., engine speed, engine load, the exhaust gas temperature, the amount of external EGR, desired pre-chamber AFR, and cylinder AFR) into one or more look-up tables, functions, or maps included in the second actuation timing calibration to determine the desired spark timing for the cylinder ignition event. In another example, the controller may make a logical determination (e.g., regarding the desired spark timing) based on logic rules that are a function of the one or more engine operating conditions and the main chamber spark ignition calibration. Generating the ignition spark in the cylinder may ignite the air-fuel mixture in the cylinder. Thus, the series gap igniter firing may be shifted relative to MBT based on engine operating conditions in order to achieve a desired cylinder ignition timing, as elaborated above with respect to 420. In some examples, the desired spark timing for operating with main chamber spark ignition may be advanced or retarded relative to pre-chamber ignition based on engine operating conditions such as engine temperature, engine load, and the amount of external EGR. Method 400 may then end.

In this way, cylinder operating parameters may be adjusted based on whether the series gap igniter provides ignition via jets of flame and hot gas from a pre-chamber combustion event (e.g., pre-chamber ignition) or via a spark in the cylinder (e.g., main chamber spark ignition). For example, a controller may detect pre-chamber ignition based on a faster/larger pressure rise rate measured by an ion sensing module after spark discharge, and may then adjust the cylinder operating parameters to favor pre-chamber ignition from an internal spark gap of the series gap igniter. Alternatively, the controller may maintain the cylinder operating parameters if those favoring pre-chamber ignition are already in use. As another example, the controller may detect main chamber spark ignition based on a slower/smaller pressure rise rate measured by the ion sensing module, and may adjust the cylinder operating parameters to favor spark ignition from an exterior spark gap of the series gap igniter. Alternatively, the controller may maintain the cylinder operating parameters if those favoring spark ignition in the main chamber are already used. Although spark may occur at both the internal spark gap and the exterior spark gap during every actuation of the series gap igniter (at least in some examples), by adjusting the cylinder operating parameters based on the detected ignition source, a combustion stability and an efficiency of the cylinder may be increased.

Turning now to FIG. 5, an exemplary timing chart 500 of a cylinder operating with pre-chamber ignition is shown. In particular, timing chart 500 shows a cylinder operating with cylinder settings adjusted for pre-chamber ignition. The cylinder may be cylinder 130 of engine 10 in FIG. 1, for example, and may include a series gap igniter, such as the series gap igniter described in FIGS. 1-3. Timing chart 500 shows one combustion cycle, wherein the combustion cycle (e.g., a cylinder cycle) refers to four strokes of an engine cycle within the cylinder. A piston position relative to top dead center (TDC), bottom dead center (BDC), and the four strokes of the combustion cycle (intake, compression, power, and exhaust) is shown in plot 502. Further, an intake valve lift is shown in plot 504, an exhaust valve lift is shown in plot 506, an EGR rate is shown in plot 508, a cylinder pressure rise rate is shown in plot 510, and a spark actuation signal is shown in plot 512. A threshold pressure rise rate is shown by dashed line 514. Further, a threshold CAD from spark plug actuation is shown by dashed line 516.

For all of the above, the horizontal axis represents engine position (e.g., in crank angle degrees), with the crank angle degrees (CAD) increasing from left to right. The vertical axis represents each labeled parameter. For plot 502, the vertical axis shows the piston position relative to TDC. For plots 504 and 506, the vertical axis shows valve lift, with a magnitude of the valve lift increasing up the vertical axis from zero. Zero valve lift corresponds to a fully closed valve, whereas non-zero valve lift corresponds to an open valve. Thus, plots 504 and 506 show a timing, lift, and duration for the corresponding valve. For plot 512, an increase in a magnitude of the parameter above zero indicates actuation of the corresponding injector or series gap igniter. For plot 508, an EGR rate further increases along the vertical axis from bottom to top. For plot 510, the pressure rise rate, as estimated by the controller based on an ionization current measured by an ion sensing module, increases along the vertical axis from bottom to top. Further, the stroke of the combustion cycle is indicated at the top of timing chart 500, the intake stroke corresponding to the interval from 0 CAD to 180 CAD, the compression stroke corresponding to the interval from 180 CAD to 360 CAD, the power stroke corresponding to the interval from 360 CAD to 540 CAD, and the exhaust stroke corresponding to the interval from 540 CAD to 720 CAD.

At the beginning of the intake stroke (e.g., around 0 CAD), the intake valve opens (plot 504), introducing air into the cylinder via the intake manifold and one or more intake ports, and the piston is at TDC (plot 502). After the intake valve opens, the exhaust valve closes (plot 506) (e.g., around 60 CAD), resulting in large positive valve overlap that increases an amount of internal EGR in the cylinder. Between 0 CAD and 180 CAD, the piston moves to the bottom of the cylinder (plot 502) so as to increase the volume within the cylinder. The position at which the piston is at its bottom-most position in the cylinder and at the end of its stroke (e.g., when the combustion chamber is at its largest volume) is typically referred to as BDC. About halfway through the intake stroke at CAD1 (e.g., around 70 CAD), fuel is introduced into the cylinder via a cylinder fuel injector (e.g., cylinder fuel injector 66 of FIG. 1), forming an air-fuel mixture with the air inducted into the cylinder via the one or more intake ports. By injecting fuel during the intake stroke, an air-fuel mixture in the cylinder may be more well-mixed relative to injecting air during the compression stroke. For example, the fuel injection amount may be calibrated so that the AFR in the cylinder is lean relative to stoichiometry. Further, the EGR rate (plot 508) is relatively high.

Next, after the beginning of the compression stroke, the intake valve closes (plot 504) around 230 CAD. During the compression stroke, the piston moves toward the cylinder head (plot 502) so as to compress the air within the cylinder. The point at which the piston is at the end of its stroke and closest to the cylinder head (e.g., when the combustion chamber is at its smallest volume) is typically referred to as TDC. During the compression stroke, as the piston moves toward TDC, pressure in the cylinder increases, which forces an amount of the air-fuel mixture into a passive pre-chamber of the series gap igniter (e.g., passive pre-chamber 188). Similarly, the pressure rise rate in the cylinder increases during the compression stroke (plot 510).

In a process herein referred to as ignition, the air-fuel mixture in the passive pre-chamber of the series gap igniter is ignited via actuating the series gap igniter (plot 510), which may cause a spark across both an upper spark gap (e.g., first spark gap 224 shown in FIG. 2) and a lower spark gap (e.g., second spark gap 226 of FIG. 2). In particular, the ignition spark across the upper spark gap ignites the air-fuel mixture in the passive pre-chamber of the series gap igniter, resulting in pre-chamber combustion. For example, the series gap igniter may be actuated at CAD2, shortly before TDC of the compression stroke (e.g., around 350 CAD). As the air-fuel mixture in the pre-chamber combusts, jets of flame and hot gas flow from the pre-chamber to the cylinder via orifices in walls of the passive pre-chamber (e.g., such as orifice 142 and orifice 222 of FIG. 2), and the jets of flame and hot gas ignite the air-fuel mixture in the cylinder. Thus, pre-chamber ignition provides an ignition source to the cylinder. Pre-chamber ignition causes the pre-chamber pressure rise rate to increase rapidly beginning at CAD2 (plot 510). Further, the pressure rise rate (plot 510) increases above the threshold pressure rise rate (dashed line 514) at CAD3, and the pressure rise rate peaks before the threshold CAD from spark plug actuation (dashed line 516). Pressure rise rate increasing above the threshold pressure rise rate and the pressure rise rate peaking before the threshold CAD from spark plug actuation indicate pre-chamber ignition as the ignition source for the cylinder, rather than main chamber spark ignition. Near the end of the power stroke, around 490 CAD, the exhaust valves are opened to release the combusted air-fuel mixtures to the corresponding exhaust passages (plot 506), and the piston position returns to TDC (plot 502).

Turning now to FIG. 6, an exemplary timing chart 600 of a cylinder operating with main chamber spark ignition is shown. In particular, timing chart 600 shows cylinder settings adjusted for operating with main chamber spark ignition. The cylinder may be cylinder 130 of engine 10 in FIG. 1, for example, and may include a series gap igniter, such as the series gap igniter described in FIGS. 1 and 2. As introduced above for timing chart 500 of FIG. 5, timing chart 600 shows one combustion cycle. Thus, timing chart 600 is similar to timing chart 500 of FIG. 5 except for the differences highlighted below. A piston position relative to TDC, BDC, and the four strokes of the combustion cycle is shown in plot 602. Further, an intake valve opening is shown in plot 604, an exhaust valve opening is shown in plot 606, an EGR rate is shown in plot 608, a cylinder pressure rise rate is shown in plot 610, and a spark actuation signal is shown in plot 612. A threshold pressure rise rate is shown by dashed line 614, and a threshold CAD after spark plug actuation is shown by dashed line 616. Further, plots for like quantities from FIG. 5 (e.g., while operating with pre-chamber ignition) are shown as dashed plots for reference. Note that the threshold pressure rise rate (dashed line 614) of FIG. 6 is equivalent to the threshold pressure rise rate (dashed line 514) of FIG. 5, and the threshold CAD after spark plug actuation (dashed line 616) of FIG. 6 is equivalent to the threshold CAD after spark plug actuation (dashed line 516) of FIG. 5.

For all of the above, the horizontal axis represents engine position (e.g., in crank angle degrees), with the crank angle degrees increasing from left to right. The vertical axis represents each labeled parameters. For plot 602, the vertical axis shows the piston position relative to TDC. For plots 604 and 606, the vertical axis shows valve lift, with a magnitude of the valve lift increasing up the vertical axis from zero. Zero valve lift corresponds to a fully closed valve, whereas non-zero valve lift corresponds to an open valve. Thus, plots 604 and 606 show a timing, lift, and duration for the corresponding valve. For plot 610, an increase in a magnitude of the parameter above zero indicates actuation of the corresponding injector or series gap igniter. For plot 608, an EGR rate increases along the vertical axis from bottom to top. Further, the stroke of the combustion cycle is indicated at the top of timing chart 600, the intake stroke corresponding to the interval from 0 CAD to 180 CAD, the compression stroke corresponding to the interval from 180 CAD to 360 CAD, the power stroke corresponding to the interval from 360 CAD to 540 CAD, and the exhaust stroke corresponding to the interval from 540 CAD to 720 CAD.

At the beginning of the intake stroke (e.g., around 0 CAD), the intake valve opens (plot 604), introducing air into the cylinder via the intake manifold and one or more intake ports, and the piston is at TDC (plot 602). Further, at 0 CAD, the exhaust valve is closed (plot 606), reducing an amount of internal EGR in the cylinder. Between 0 and 180 CAD, the piston position moves to the bottom of the cylinder (plot 602) so as to increase the volume within the cylinder. Before the end of the intake stroke (e.g., around 160 CAD), the intake valve closes (plot 604), while the exhaust valve remains closed (plot 606). Further, the overlap between the intake valve (plot 604) and the exhaust valve (plot 606) is reduced, which may decrease cylinder dilution.

During the compression stroke (e.g., between 180 CAD and 360 CAD), the piston moves toward the cylinder head (plot 602) so as to compress the air within the cylinder. About halfway through the compression stroke at CAD1 (e.g., around 270 CAD), fuel is introduced into the cylinder via a cylinder fuel injector (e.g., cylinder fuel injector 66 of FIG. 1), forming an air-fuel mixture with the air inducted into the cylinder via the one or more intake ports. Further, the EGR rate (plot 608) is lower relative to the EGR rate while operating with pre-chamber ignition (plot 508).

In a process herein referred to as ignition, the air-fuel mixture in the cylinder is ignited via actuating the series gap igniter (plot 610), which may cause a spark across both the first spark gap 224 and lower spark gap 226. In particular, the ignition spark across the lower spark gap ignites the air-fuel mixture in the main chamber, resulting in cylinder combustion. For example, the series gap igniter may be actuated before TDC of the compression stroke at CAD2 (e.g., around 330 CAD). While operating with main chamber spark ignition, spark timing may be further from TDC of the compression stroke (plot 610) relative to spark timing while operating with pre-chamber ignition (dashed plot 510). Further, as shown in plot 610, the pressure rise rate increases later while operating with main chamber spark ignition, relative to the pressure rise rate while operating with pre-chamber ignition (plot 510). In particular, the pressure rise rate while operating with main chamber spark ignition (plot 610) peaks after the threshold CAD after spark plug actuation (dashed line 616), while the pressure rise rate while operating with pre-chamber ignition (plot 510) peaks before the threshold CAD after spark plug actuation. Further, the pressure rise rate while operating with main chamber spark ignition (plot 610) does not exceed the threshold pressure rise rate (dashed line 614). Pressure rise rate not exceeding the threshold pressure rise rate and the pressure rise rate peaking after the threshold CAD after spark plug actuation indicates main chamber spark ignition as the primary ignition source.

During the exhaust stroke, the exhaust valves are opened (plot 606) to release the combusted air-fuel mixture to the corresponding exhaust passages, and the piston position returns to TDC (plot 602). As shown, exhaust valve opening while operating with main chamber spark ignition may be retarded (plot 606) relative to exhaust valve opening while operating with pre-chamber ignition (dashed plot 506). Further, as shown, the exhaust valve may close earlier while operating with main chamber spark ignition in order to decrease an overlap between the intake valve and the exhaust valve.

Turning now to FIG. 7, a prophetic example timeline 700 of an engine transitioning between pre-chamber ignition and main chamber spark ignition is shown. The engine may be engine 10 in FIG. 1, including cylinder 130 and series gap igniter 192, for example. Although some parameters are shown for a single cylinder in FIG. 7, it may be understood that the cylinder may be included in a multi-cylinder engine system. An indication of whether the engine is operating with main chamber spark ignition ("main chamber") or pre-chamber ignition ("pre-chamber") based on a signal from an ion sensing module (e.g., such as ion sensing module 194 shown in FIG. 1) is shown in plot 702, a pedal position (e.g., a determined based on a signal from an accelerator pedal position sensor, such as accelerator pedal position sensor 118 of FIG. 1) is shown in plot 704, an engine load is shown by plot 706, an EGR valve position is shown by plot 708, and an amount of spark retard (e.g., from MBT spark timing) is shown by plot 710. For all of the above, the horizontal axis represents time, with time increasing along the horizontal axis from left to right. The vertical axis represents each labeled parameter. For each of plots 704, 706, and 708, a magnitude of the parameter increases up the vertical axis. For plot 702, the vertical axis shows whether ignition source is pre-chamber ignition ("pre-chamber") or main chamber spark ignition ("main chamber").

At time t0, the engine operates with pre-chamber ignition (plot 702) and the pedal position is relatively high (e.g., corresponding to a high driver-demanded torque), as shown in plot 704. Because of the high driver-demanded torque, the engine load is relatively high (plot 706), and the amount of spark retard (plot 710) is relatively high. Further, because pre-chamber ignition includes pre-chamber ignition, the EGR valve position is high in order to increase cylinder dilution (plot 708). Between time t0 and time t1, the ignition source (plot 702) remains constant, the pedal position (plot 704) remains constant, the amount of spark retard (plot 710) remains constant, the EGR valve position (plot 708) remains constant, and the engine load (plot 706) fluctuates slightly without any changes greater than 5%.

Just before time t1, the pedal position (plot 704) decreases due to a decrease in driver-demanded torque. Thus, between time t1 and time t2, the engine load decreases (plot 706) in response to the decrease in the driver-demanded torque. The amount of spark retard (plot 708) also decreases due to a decreased risk of knock at the lower engine load. Further, as the engine load decreases, the EGR valve position (plot 708) is decreased. However, between time t1 and time t2, the engine continues to operate with pre-chamber ignition (plot 702), such that pre-chamber ignition provides ignition to the cylinders. For example, because the engine load is still relatively high between time t1 and time t2, combustion may reliably occur in the pre-chamber.

At time t2, the engine load (plot 706) decreases further, such that the series gap igniter provides ignition to the cylinder via the spark gap in the cylinder, rather than pre-chamber ignition. For example, at time t2, combustion may not occur in the pre-chambers of the cylinders, or may be relatively weak, so that the primary ignition source is a spark in the main chamber. In response, the detected ignition source changes to main chamber spark ignition (plot 702). As such, cylinder operation is adjusted for main chamber spark ignition. As outlined in method 400 of FIG. 4, adjusting cylinder operation for main chamber spark ignition may include adjusting a fuel injection amount, a valve timing, and a spark timing. Thus, when the detected ignition source is main chamber spark ignition (plot 702), cylinder operation is adjusted for main chamber spark ignition by decreasing the amount of spark retard (plot 708) to a lower value.

Between time t2 and time t3, the pedal position (plot 704) does not change, the engine load (plot 706) remains low, and the detected ignition source is main chamber spark ignition (plot 702). As a result, cylinder operation continues to be adjusted for operating with main chamber spark ignition (plot 702). For example, the amount of spark retard (plot 710) is adjusted relatively low while operating with main chamber spark ignition. Further, the EGR valve position is decreased to zero in order to decrease dilution (plot 708). Because the pedal position (plot 704) remains low, the engine load (plot 706) continues to decrease between time t2 and time t3.

Just before time t3, the pedal position (plot 704) increases, and the engine load (plot 706) begins to increase. Between time t3 and time t4, the pedal position (plot 704) remains constant while the engine load (plot 706) increases. Further, the amount of spark retard (plot 710) begins to increase due to the increasing engine load and its effect on knock. The EGR valve position increases so as to increase dilution in the cylinders (plot 708).

At time t4, the engine load (plot 706) increases further. In response, the engine transitions to operating with pre-chamber ignition (plot 702). After time t4, the pedal position (plot 704) remains constant, and the engine load (plot 706) increases further. Therefore, the engine continues operating with pre-chamber ignition (plot 702) after time t4.

In this way, a cylinder with a series gap igniter may be operated to favor different ignition sources based on engine operating conditions in order to efficiently and reliably initiate combustion. By adjusting cylinder settings for pre-chamber ignition and main chamber spark ignition based on a signal from an ion sensing module coupled to the series gap igniter, the engine may increase efficiency while providing pre-chamber ignition (e.g., igniting an air-fuel mixture in the cylinder with jets of flame and hot gas from combustion in a passive pre-chamber) and spark ignition (e.g., igniting the air-fuel mixture in the cylinder with an ignition spark in the cylinder). For example, the single series gap igniter enables both pre-chamber ignition and direct spark ignition within the cylinder. Pre-chamber ignition may increase a burn rate and an efficiency of the cylinder during engine operating conditions that increase combustion stability in the passive pre-chamber, such as higher engine loads and temperatures, while main chamber spark ignition ensures that cylinder ignition is reliably provided during conditions in which the combustion stability of the passive pre-chamber is expected to be relatively low. By providing both pre-chamber ignition and conventional spark ignition via a single series gap igniter, a number of components is reduced compared with systems that include active pre-chambers and/or additional spark plugs. By determining whether the series gap igniter is operating with pre-chamber ignition or main chamber spark ignition based on the signal from the ion sensing module, efficiency and combustion stability while operating in each of the two sources may be increased. Overall, providing a series gap igniter in the cylinder may increase combustion stability across a range of operating conditions without increasing a package size or complexity of the ignition system.

The technical effect of monitoring an ionization current of a series gap igniter in a cylinder having a passive pre-chamber, a first spark gap of the series gap igniter within the pre-chamber and a second spark gap of the series gap igniter external to the pre-chamber and within a main chamber of the cylinder, is that an ignition source can be accurately determined, thereby increasing combustion stability and reducing an occurrence of cylinder misfire and undesirable noise, vibration, and handling issues that may otherwise occur.

As an example, a method comprises: determining a location of an initial combustion in a cylinder from a series gap igniter based on a pressure rise rate in the cylinder, and adjusting at least one setting of the cylinder based on the determined location. In the preceding example, additionally or optionally, the series gap igniter includes a first spark gap positioned in an internal volume of the series gap igniter and a second spark gap positioned on an external surface of the series gap igniter, and the location is one of the first spark gap and the second spark gap. In one or both of the preceding examples, additionally or optionally, the at least one setting includes a desired spark timing for actuating the series gap igniter, and adjusting the at least one setting of the cylinder based on the determined location comprises: responsive to determining the location is the first spark gap, adjusting the desired spark timing for actuating the series gap igniter using a first spark timing calibration and actuating the series gap igniter at the desired spark timing, and responsive to determining the location is the second spark gap, adjusting the desired spark timing for actuating the series gap igniter using a second spark timing calibration, different than the first spark timing calibration, and actuating the series gap igniter at the desired spark timing. In any or all of the preceding examples, additionally or optionally, determining the location of the initial combustion in the cylinder from the series gap igniter based on the pressure rise rate in the cylinder comprises: determining the location is the first spark gap responsive to the pressure rise rate exceeding a threshold pressure rise rate, and determining the location is the second spark gap responsive to the pressure rise rate being less than the threshold pressure rise rate. In any or all of the preceding examples, additionally or optionally, determining the location of the initial combustion in the cylinder from the series gap igniter based on the pressure rise rate in the cylinder comprises: determining the location is the first spark gap responsive to the pressure rise rate increasing within a threshold number of crank angle degrees after actuating the series gap igniter, and determining the location is the second spark gap responsive to the pressure rise rate increasing outside of the threshold number of crank angle degrees after actuating the series gap igniter. In any or all of the preceding examples, additionally or optionally, the at least one setting includes a valve overlap duration of the cylinder, and adjusting the at least one setting of the cylinder based on the determined location comprises: increasing the valve overlap duration responsive to determining the location is the first spark gap relative to determining the location is the second spark gap. In any or all of the preceding examples, additionally or optionally, the at least one setting includes an exhaust gas recirculation (EGR) rate, and adjusting the at least one setting of the cylinder based on the determined location comprises: increasing EGR rate responsive to determining the location is the first spark gap relative to determining the location is the second spark gap. In any or all of the preceding examples, additionally or optionally, the at least one setting includes an air-fuel ratio (AFR) of the cylinder, and adjusting the at least one setting of the cylinder based on the determined location comprises: operating with an AFR lean relative to stoichiometry, responsive to determining the location is the first spark gap, and operating with an AFR rich relative to stoichiometry, responsive to determining the location is the second spark gap. In any or all of the preceding examples, additionally or optionally, the at least one setting includes an AFR of the cylinder, and adjusting the at least one setting of the cylinder based on the determined location comprises operating with a stoichiometric AFR responsive to determining the location is the second spark gap. In any or all of the preceding examples, additionally or optionally, the cylinder is coupled to a variable valve train. In any or all of the preceding examples, additionally or optionally, the first spark gap initiates combustion in the cylinder via pre-chamber ignition when the location of the ignition spark is the first spark gap and the second spark gap initiates combustion in the cylinder via spark ignition in the cylinder when the location of the ignition spark is the second spark gap, and actuating the series gap igniter produces sparks at both the first spark gap and the second spark gap. In any or all of the preceding examples, additionally or optionally, the pressure rise rate in the cylinder is estimated based at least in part on a signal from an ion sensing module coupled to the series gap igniter.

As another example, a system comprises: a series gap igniter coupled to a cylinder, the series gap igniter including a first spark gap in an internal volume of the series gap igniter and a second spark gap of the series gap igniter external to the internal volume of the series gap igniter and within a clearance volume of the cylinder, and an ion sensing module electrically coupled to the series gap igniter. In the preceding example, additionally or optionally, the series gap igniter further includes a first electrode positioned entirely within the internal volume of the series gap igniter and a second electrode extending between the internal volume and the clearance volume of the cylinder, and wherein the first electrode includes a single electrode tip and the second electrode includes a first electrode tip positioned within the internal volume of the series gap igniter and a second electrode tip positioned within the clearance volume of the cylinder. In one or both of the preceding examples, additionally or optionally, the first spark gap is between the single electrode tip of the first electrode and the first electrode tip of the second electrode, wherein the series gap igniter further includes a ground electrode tip coupled directly to a wall of the series gap igniter, the ground electrode tip positioned within the clearance volume of the cylinder, and wherein the second spark gap is between the second electrode tip of the second electrode and the ground electrode tip, and wherein the wall of the series gap igniter separates the internal volume of the series gap igniter from the clearance volume of the cylinder, and one or more orifice in the wall fluidically couple the internal volume of the series gap igniter to the clearance volume of the cylinder. In any or all of the preceding examples, additionally or optionally, the series gap igniter produces a first spark across the first spark gap and a second spark across the second spark gap when actuated, and the ion sensing module is configured to measure an ionization current across each of the first spark gap and the second spark gap.

As yet another example, a system comprises: a cylinder of an engine including a series gap igniter, the series gap igniter coupled to an ion sensing module and including a first spark gap internal to a pre-chamber and a second spark gap external to the pre-chamber, a controller storing executable instructions in non-transitory memory that, when executed cause the controller to: provide a first spark via the first spark gap and a second spark via a second spark gap by actuating the series gap igniter, and adjust a timing of actuating the series gap igniter based on a signal from the ion sensing module. In the preceding example, additionally or optionally, to adjust the timing of actuating the series gap igniter based on the signal from the ion sensing module, the controller includes further instructions stored in non-transitory memory that, when executed, cause the controller to: determine a pressure rise rate in the cylinder following actuating the series gap igniter based on the signal from the ion sensing module, responsive to the pressure rise rate being greater than a threshold pressure rise rate, operate the series gap igniter using a first actuation timing calibration, and responsive to the pressure rise rate being less than the threshold pressure rise rate, operate the series gap igniter using a second actuation timing calibration. In one or both of the preceding examples, additionally or optionally, the first actuation timing calibration includes later actuation timing relative to the second actuation timing calibration. In any or all of the preceding examples, additionally or optionally, the cylinder further includes an exhaust gas recirculation (EGR) valve, and the controller includes further instructions stored in non-transitory memory that, when executed, cause the controller to: operate with a higher EGR rate while operating the series gap igniter with the first actuation timing calibration than while operating the series gap igniter with the second actuation timing calibration.

In another representation, a system comprises: an engine including a plurality of cylinders, each cylinder including a series gap igniter, the series gap igniter including a first spark gap internal to a pre-chamber and a second spark gap external to the pre-chamber. In the preceding example, additionally or optionally, the series gap igniter further includes an upper electrode and a lower electrode, the upper electrode including an upper electrode tip positioned within the pre-chamber, the lower electrode including a first lower electrode tip positioned within the pre-chamber and a second lower electrode tip positioned external to the pre-chamber. In one or both of the preceding examples, additionally or optionally, the first spark gap is positioned between the upper electrode tip and the first lower electrode tip. In any or all of the preceding examples, additionally or optionally, the series gap igniter further includes a ground electrode tip coupled to an outer wall of the series gap igniter, and wherein the second spark gap is positioned between the second lower electrode tip and the ground electrode tip. In any or all of the preceding examples, additionally or optionally, the upper electrode tip, the first lower electrode tip, and the second lower electrode tip are aligned along a central axis of the series gap igniter, and wherein the ground electrode tip is not aligned along the central axis of the series gap igniter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   determining a location of an initial combustion in a cylinder from a series gap igniter based on a pressure rise rate in the cylinder; and
   adjusting at least one setting of the cylinder based on the determined location.

2. The method of claim 1, wherein the series gap igniter includes a first spark gap positioned in an internal volume of the series gap igniter and a second spark gap positioned on an external surface of the series gap igniter, and the location is one of the first spark gap and the second spark gap.

3. The method of claim 2, wherein the at least one setting includes a desired spark timing for actuating the series gap igniter, and adjusting the at least one setting of the cylinder based on the determined location comprises:
   responsive to determining the location is the first spark gap, adjusting the desired spark timing for actuating the series gap igniter using a first spark timing calibration and actuating the series gap igniter at the desired spark timing; and
   responsive to determining the location is the second spark gap, adjusting the desired spark timing for actuating the series gap igniter using a second spark timing calibration, different than the first spark timing calibration, and actuating the series gap igniter at the desired spark timing.

4. The method of claim 2, wherein determining the location of the initial combustion in the cylinder from the series gap igniter based on the pressure rise rate in the cylinder comprises:
   determining the location is the first spark gap responsive to the pressure rise rate exceeding a threshold pressure rise rate; and
   determining the location is the second spark gap responsive to the pressure rise rate being less than the threshold pressure rise rate.

5. The method of claim 2, wherein determining the location of the initial combustion in the cylinder from the series gap igniter based on the pressure rise rate in the cylinder comprises:
   determining the location is the first spark gap responsive to the pressure rise rate increasing within a threshold number of crank angle degrees after actuating the series gap igniter; and
   determining the location is the second spark gap responsive to the pressure rise rate increasing outside of the threshold number of crank angle degrees after actuating the series gap igniter.

6. The method of claim 2, wherein the at least one setting includes a valve overlap duration of the cylinder, and adjusting the at least one setting of the cylinder based on the determined location comprises:
   increasing the valve overlap duration responsive to determining the location is the first spark gap relative to determining the location is the second spark gap.

7. The method of claim 2, wherein the at least one setting includes an exhaust gas recirculation (EGR) rate, and adjusting the at least one setting of the cylinder based on the determined location comprises:
   increasing EGR rate responsive to determining the location is the first spark gap relative to determining the location is the second spark gap.

8. The method of claim 2, wherein the at least one setting includes an air-fuel ratio (AFR) of the cylinder, and adjusting the at least one setting of the cylinder based on the determined location comprises:
   operating with an AFR lean relative to stoichiometry, responsive to determining the location is the first spark gap; and
   operating with an AFR rich relative to stoichiometry, responsive to determining the location is the second spark gap.

9. The method of claim 2, wherein the at least one setting includes an AFR of the cylinder, and adjusting the at least one setting of the cylinder based on the determined location comprises operating with a stoichiometric AFR responsive to determining the location is the second spark gap.

10. The method of claim 2, wherein the cylinder is coupled to a variable valve train.

11. The method of claim 2, wherein the first spark gap initiates combustion in the cylinder via pre-chamber ignition when the location of the initial combustion is the first spark gap and the second spark gap initiates combustion in the cylinder via spark ignition in the cylinder when the location of the ignition spark is the second spark gap, and actuating the series gap igniter produces sparks at both the first spark gap and the second spark gap.

12. The method of claim 1, wherein the pressure rise rate in the cylinder is estimated based at least in part on a signal from an ion sensing module coupled to the series gap igniter.

13. A system, comprising:
   a series gap igniter coupled to a cylinder, the series gap igniter including a first spark gap in an internal volume of the series gap igniter and a second spark gap of the series gap igniter external to the internal volume of the series gap igniter and within a clearance volume of the cylinder;

an ion sensing module electrically coupled to the series gap igniter; and a controller storing executable instructions in non-transitory memory that, when executed cause the controller to:

determine a location of an initial combustion in the cylinder from the series gas ignited based on a pressure rise rate in the cylinder; and adjust at least one setting of the cylinder based on the determined location.

14. The system of claim 13, wherein the series gap igniter further includes a first electrode positioned entirely within the internal volume of the series gap igniter and a second electrode extending between the internal volume and the clearance volume of the cylinder; and wherein the first electrode includes a single electrode tip and the second electrode includes a first electrode tip positioned within the internal volume of the series gap igniter and a second electrode tip positioned within the clearance volume of the cylinder.

15. The system of claim 14, wherein the first spark gap is between the single electrode tip of the first electrode and the first electrode tip of the second electrode;

wherein the series gap igniter further includes a ground electrode tip coupled directly to a wall of the series gap igniter, the ground electrode tip positioned within the clearance volume of the cylinder, and wherein the second spark gap is between the second electrode tip of the second electrode and the ground electrode tip; and wherein the wall of the series gap igniter separates the internal volume of the series gap igniter from the clearance volume of the cylinder, and one or more orifice in the wall fluidically couple the internal volume of the series gap igniter to the clearance volume of the cylinder.

16. The system of claim 13, wherein the series gap igniter produces a first spark across the first spark gap and a second spark across the second spark gap when actuated, and the ion sensing module is configured to measure an ionization current across each of the first spark gap and the second spark gap.

17. A system, comprising:

a cylinder of an engine including a series gap igniter, the series gap igniter coupled to an ion sensing module and including a first spark gap internal to a pre-chamber and a second spark gap external to the pre-chamber, wherein the cylinder further includes an exhaust gas recirculation (EGR) valve;

a controller storing executable instructions in non-transitory memory that, when executed cause the controller to:

provide a first spark via the first spark gap and a second spark via the second spark gap by actuating the series gap igniter;

adjust a timing of actuating the series gap igniter based on a signal from the ion sensing module; and operate with a higher EGR rate while operating the series gap igniter with the first actuation timing calibration than while operating the series gap igniter with the second actuation timing calibration.

18. The system of claim 17, wherein to adjust the timing of actuating the series gap igniter based on the signal from the ion sensing module, the controller includes further instructions stored in non-transitory memory that, when executed, cause the controller to:

determine a pressure rise rate in the cylinder following actuating the series gap igniter based on the signal from the ion sensing module;

responsive to the pressure rise rate being greater than a threshold pressure rise rate, operate the series gap igniter using a first actuation timing calibration; and responsive to the pressure rise rate being less than the threshold pressure rise rate, operate the series gap igniter using a second actuation timing calibration.

19. The system of claim 18, wherein the first actuation timing calibration includes later actuation timing relative to the second actuation timing calibration.

* * * * *